United States Patent [19]
Imoto

[11] Patent Number: 5,742,722
[45] Date of Patent: Apr. 21, 1998

[54] RARE EARTH ELEMENT-DOPED MULTIPLE-CORE OPTICAL FIBER AND OPTICAL SYSTEMS USING THE SAMEFIELD OF THE INVENTION

[75] Inventor: Katsuyuki Imoto, Saitama, Japan

[73] Assignee: Hitachi Cable, Ltd., Tokyo, Japan

[21] Appl. No.: 791,428

[22] Filed: Jan. 27, 1997

Related U.S. Application Data

[62] Division of Ser. No. 695,493, Aug. 12, 1996.

[30] Foreign Application Priority Data

Feb. 22, 1996 [JP] Japan .................... 8-035262
Mar. 28, 1996 [JP] Japan .................... 8-074793

[51] Int. Cl.$^6$ .................................................. G02B 6/02
[52] U.S. Cl. ...................... 385/126; 385/123; 385/124; 385/141; 372/70; 359/333; 359/341
[58] Field of Search .................... 385/141, 126, 385/125, 123, 124, 142, 143, 144, 145; 372/70; 359/333, 341

[56] References Cited

U.S. PATENT DOCUMENTS 5,570,448  10/1996  Imoto et al. ................. 385/124 X

FOREIGN PATENT DOCUMENTS 5-299733  11/1993  Japan .
5-345632  12/1993  Japan .
6-37385   2/1994   Japan .
6-216441  8/1994   Japan .
8-43644   2/1996   Japan .
8-43668   2/1996   Japan .

*Primary Examiner*—Phan T. H. Palmer
*Attorney, Agent, or Firm*—Lowe, Price, LeBlanc & Becker

[57] ABSTRACT

A rare earth element-doped multiple-core optical fiber 31 has a bundle of cores 32-1~32-7 co-doped with Er and Al, primary cladding layers 33 covering each core, and an outer cladding layer 34 covering all cores 32-1~32-7, wherein one core 32-1 being positioned substantially on a central axis of the outer cladding layer and surrounded by other six cores 32-2~32-7. A core diameter Dc of the center core 32-1 is smaller than a core diameter Do of each peripheral core 32-2~32-7. The power of both signal light (1.53 μm~1.57 μm wavelength bands) and pumping light (0.98 μm or 1.48 μm band) propagating through the center core 32-1 becomes lower and the power propagating through each core 32-1~32-7 is equalized, and the flatter characteristics of gain to wavelength are obtained.

6 Claims, 20 Drawing Sheets

RARE EARTH ELEMENT-DOPED MULTIPLE-CORE OPTICAL FIBER AND OPTICAL SYSTEMS USING THE SAMEFIELD OF THE INVENTION

This application is a division of application Ser. No. 08/695,493 filed Aug. 12, 1996 pending.

This invention relates to a rare earth element-doped optical fiber and optical systems using the same, and more particularly to, a rare earth element-doped multiple-core optical fiber and optical systems, such as an optical fiber amplifying multiplexer/demultiplexer and an optical fiber amplifying repeater, in which widely flat characteristics of gain to wavelength are required.

BACKGROUND OF THE INVENTION

These days, an optical fiber amplifier using a rare earth element-doped optical fiber, which is doped with rare earth element such as Er, Pr, Nd, etc. into a core thereof, has been developed and improved for practice. Especially, an Er-doped optical fiber amplifier, which can provide a high gain and a high saturated output power at the 1.55 μm wavelength band, is expected to be applied to various optical systems. Its application to a high-speed, large-quantity, and long-distance optical transmission system using a wavelength division multiplexing transmission technique of more than several channels between 1.53 μm and 1.56 μm wavelength bands, and an optical cable television (CATV) system, for example, has been noted. In such optical transmission systems, it is important that the Er-doped optical fiber amplifier has flat gain characteristic in such wavelength bands so as to suppress deterioration of the characteristics of signal-to-noise ratio and cross-talk.

In order to realize such flat characteristics of gain to wavelength, an Er-doped multiple-core optical fiber and an optical fiber amplifier using the same have been proposed by the inventor. The optical fiber comprises plural cores doped with rare earth elements, such as Er and Al together, and an outer cladding layer which is provided around the cores, each of which is directly covered by a primary cladding layer. For this structure, the cores can contain much higher concentration of Al dopant than a single core of a conventional Er-doped optical fiber. Further more, gain of each core is to be lowered to obtain flat characteristics of gain to wavelength, then, high gain is provided by superposing all outputs thereof in addition to the flattened characteristics of gain to wavelength.

In an optical fiber amplifier using such a proposed Er-doped multiple-core optical fiber, however, there is a disadvantage in that the characteristics of gain to wavelength become worse and unsatisfactory when a higher gain, such as near 40 dB, need to be obtained.

SUMMARY OF THE INVENTION

Accordingly, it is an object of the invention to provide a rare earth element-doped multiple-core optical fiber, and an optical systems using the same, by which widely flat characteristics of gain to wavelength at higher gain range is obtained.

It is a further object of the invention to provide a rare earth element-doped multiple-core optical fiber, and an optical systems using the same, by which a higher gain, large-quantity and long-distance signal transmission is possible.

According to the first feature of the invention, a rare earth element-doped multiple-core optical fiber, comprises:

a plurality of cores each having a refractive index of $n_w$, doped with at least one rare earth element therein; and an outer cladding layer having a refractive index of $n_c$ ($n_w > n_c$), and covering the cores;

wherein the cores are positioned substantially on a central axis of the outer cladding layer, at least one of which is surrounded by remaining cores having a larger core diameter than the surrounded core.

According to the second feature of the invention, a rare earth element-doped multiple-core optical fiber, comprises:

a plurality of cores each doped with at least one rare earth element therein; and an outer cladding layer having a lower refractive index than said cores, and covering the cores;

wherein the cores are positioned substantially on a central axis of the outer cladding layer, at least one of which is surrounded by remaining cores having a higher refractive index than the surrounded core.

According to the third feature of the invention, a rare earth element-doped multiple-core optical fiber, comprises:

a plurality of cores each doped with at least one rare earth element therein; and an outer cladding layer having a lower refractive index than said cores, and covering the cores;

wherein the cores are positioned substantially on a central axis of the outer cladding layer, at least one of which is surrounded by remaining cores containing a larger amount of rare earth element than the surrounded core.

According to the forth feature of the invention, a rare earth element-doped multiple-core optical fiber amplifier, comprises:

a rare earth element-doped multiple-core optical fiber, comprising:
a plurality of cores each having a refractive index of $n_w$, doped with at least one rare earth element therein; and an outer cladding layer having a refractive index of $n_c$ ($n_w > n_c$), and covering the cores; wherein the cores are positioned substantially on a central axis of the outer cladding layer, at least one of which is surrounded by remaining cores having a larger core diameter than the surrounded core, at least one pumping light source;

at least one wavelength division multiplexing circuit for coupling an pumping light with one end of the rare earth element-doped multiple-core optical fiber; and an isolator disposed between the wavelength division multiplexing circuit and the one end of the rare earth element-doped multiple-core optical fiber.

According to the fifth feature of the invention, a rare earth element-doped multiple-core optical fiber amplifier, comprises:

a rare earth element-doped multiple-core optical fiber, comprising:
a plurality of cores each having a refractive index of $n_w$ doped with at least one rare earth element therein; and an outer cladding layer having a refractive index of $n_c$ ($n_w > n_c$) and covering the cores; wherein the cores are positioned substantially on a central axis of the outer cladding layer, at least one of which is surrounded by remaining cores having a larger core diameter than the surrounded core, at least one pumping light source;

at least one wavelength division multiplexing circuit for coupling an pumping light with one end of the rare earth element-doped multiple-core optical fiber; and an isolator disposed between the wavelength division multiplexing circuit and the one end of the rare earth element-doped multiple-core optical fiber.

According to the sixth feature of the invention, a rare earth element-doped multiple-core optical fiber amplifier, comprises:
- a rare earth element-doped multiple-core optical fiber, comprising:
  - a plurality of cores each doped with at least one rare earth element therein; and an outer cladding layer having a lower refractive index than the cores, and covering the cores; wherein the cores are positioned substantially on a central axis of the outer cladding layer, at least one of which is surrounded by remaining cores having a higher refractive index than the surrounded core,
- at least one pumping light source;
- at least one wavelength division multiplexing circuit for coupling an pumping light with one end of the rare earth element-doped multiple-core optical fiber; and
- an isolator disposed between the wavelength division multiplexing circuit and the one end of the rare earth element-doped multiple-core optical fiber.

According to the seventh feature of the invention, a rare earth element-doped multiple-core optical fiber amplifier, comprises: a rare earth element-doped multiple-core optical fiber, comprising: a plurality of cores each doped with at least one rare earth element therein; and an outer cladding layer having a lower refractive index than the cores, and covering the cores; wherein the cores are positioned substantially on a central axis of the outer cladding layer, at least one of which is surrounded by remaining cores containing a larger amount of rare earth element than the surrounded core,
- at least one pumping light source;
- at least one wavelength division multiplexing circuit for coupling an pumping light with one end of the rare earth element-doped multiple-core optical fiber; and
- an isolator disposed between the wavelength division multiplexing circuit and the one end of the rare earth element-doped multiple-core optical fiber.

According to the eighth feature of the invention, a rare earth element-doped multiple-core optical fiber system, comprises:
- at least one rare earth element-doped multiple-core optical fiber amplifier for amplifying a signal light by stimulated emission; and
- at least one dispersion-shifted optical fiber connected to an input end and/or an output end of the rare earth element-doped multiple-core optical fiber amplifier.

BRIEF DESCRIPTION OF THE DRAWINGS

The invention will be explained in more detailed in conjunction with the appended drawings, wherein.

DESCRIPTION OF THE PREFERRED EMBODIMENTS

Figure 1:
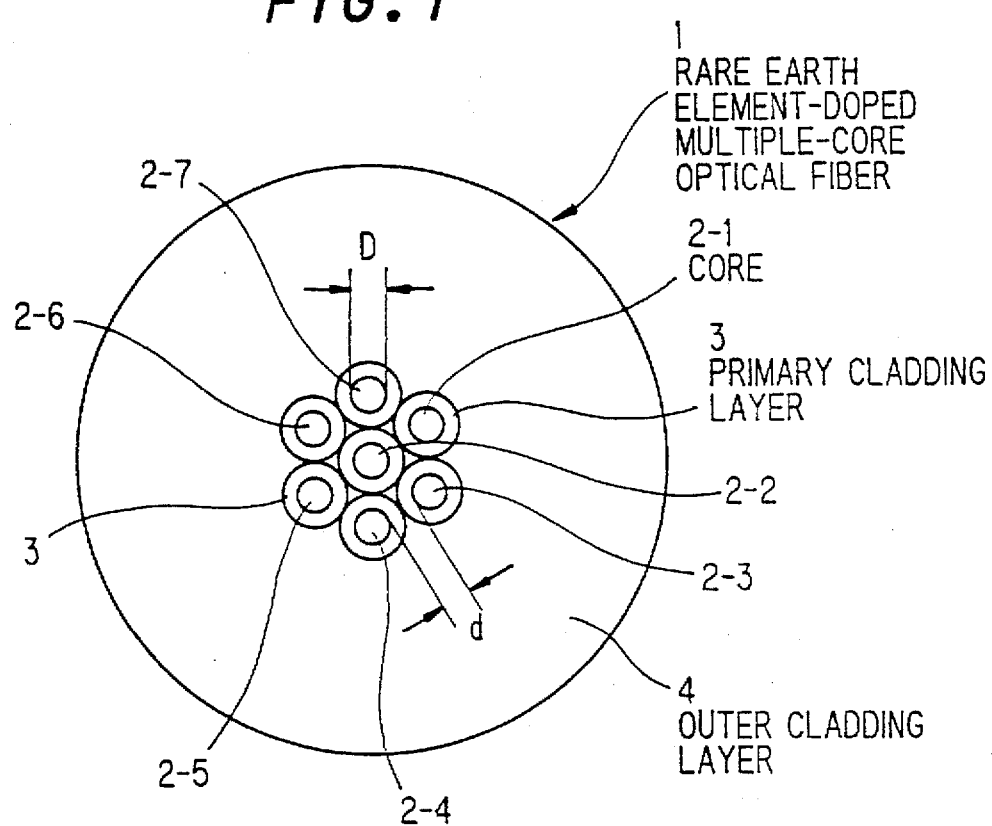
FIG. 1 is a cross-sectional view showing a rare earth element-doped multiple-core optical fiber which is formerly proposed by the inventors.

Before explaining a rare earth element-doped multiple-core optical fiber in the first preferred embodiment, the aforementioned rare earth element-doped multiple-core optical fiber formerly proposed by the inventors, and the optical fiber amplifier using the same will be explained in FIGS. 1 and 2.

The Er-doped optical fiber 1 comprises plural cores 2-1, 2-2, 2-3, 2-4, 2-5, 2-6 and 2-7 (seven cores in this case), doped with rare earth elements, such as Er and Al together, and an outer cladding layer 4 which is provided around the cores 2-1~2-7, each of which is directly covered by a primary cladding layer 3.

According to such structures of the Er-doped multiple-core optical fiber, as mentioned before, high gain is obtained as well as the flat characteristics of gain to wavelength. The reasons for this will be explained in more detail by the following.

First, the cores can contain much higher concentration of Al dopant than a single core in a conventional Er-doped optical fiber. Second, for this structure, though a gain of each core is to be lowered to obtain flat characteristics of gain to wavelength, a high gain is provided by superposing all outputs thereof in addition to the flattened characteristics of gain to wavelength. The conventional characteristics of gain to wavelength show that an injected pumping light power is lowered, a peak of gain observed near 1.535 μm wavelength decreases, and gain relative to wavelength becomes flat gradually. As the pumping light power becomes lower, a right hand increasing tendency is observed, that is to say, the gain at a, shorter wavelength band 1.53 μm wavelength side) becomes lower, and the gain at a longer wavelength band (1.56 μm wavelength side) becomes high. If the pumping light power is extremely lowered, the gain is too low to be used as an optical fiber amplifier. The Er-doped multiple-core optical fiber proposed by the inventors utilizes such principle actively. If an outer diameter D of the core 2-1~2-7, and a spacing d among the cores 2 is optimized so that an pumping light and an signal light are almost equally distributed and propagating in each core, a gain of each core is low but a flat gain relative to wavelength is obtained. The signal lights, being propagating through a certain length of the fiber, are amplified in each core, respectively, and superposed as an output signal. As a result, the gain is high, and the characteristics of gain to wavelength are flattened.

Figure 2:
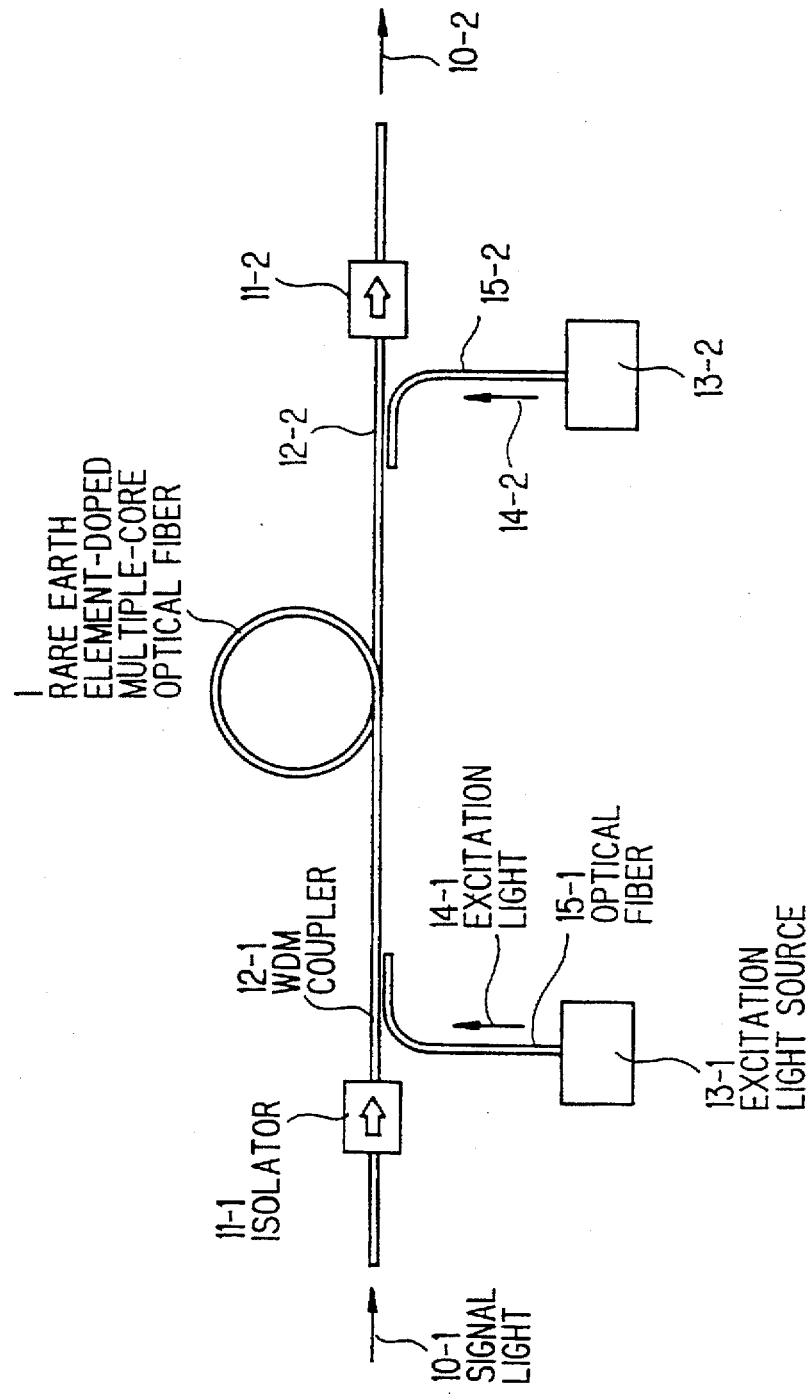
FIG. 2 is a structural view showing a rare earth element-doped multiple-core optical fiber amplifier which is formerly proposed by the inventors.

FIG. 2 shows a rare-earth element-doped multiple-core optical fiber amplifier using such optical fiber, which comprises a certain length of a rare-earth element-doped multiple-core optical fiber 1, wavelength division multiplexing (WDM) couplers 12-1 and 12-2, pumping light sources 13-1 and 13-2 for emitting pumping lights 14-1 and 14-2, and optical isolators 11-1 and 11-2 disposed at front and back stages of the optical fiber 1, respectively.

In operation, the pumping lights 14-1 and 14-2 of short wavelength laser, such as semiconductor lasers, are coupled with the Er-doped multiple-core optical fiber 1 through optical fibers 15-1 and 15-2, and the WDM couplers 8-1 and 8-2, while a signal light 10-1 is input into the optical fiber 1. The pumping lights are absorbed in the optical fiber 1 inherently, the certain energy levels of Er ions are excited, and amplification occurs due to stimulated emission. The signal light 10-1 propagating through the optical fiber 1 is amplified in the optical fiber 1 and output as an amplified signal light 10-2. The optical isolators 11-1 and 11-2 are preferably used for suppressing a retrograde signal light of the amplified signal light 10-2.

Figure 3:
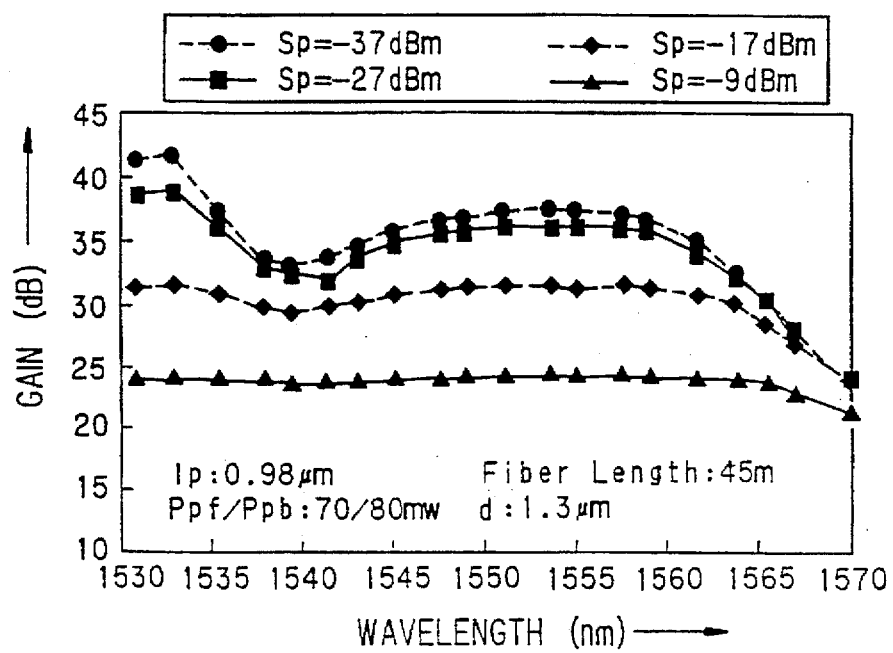
FIG. 3 is a graph showing the characteristics of gain to wavelength for the rare earth element-doped multiple-core optical fiber shown in FIG. 2.
Figure 4:
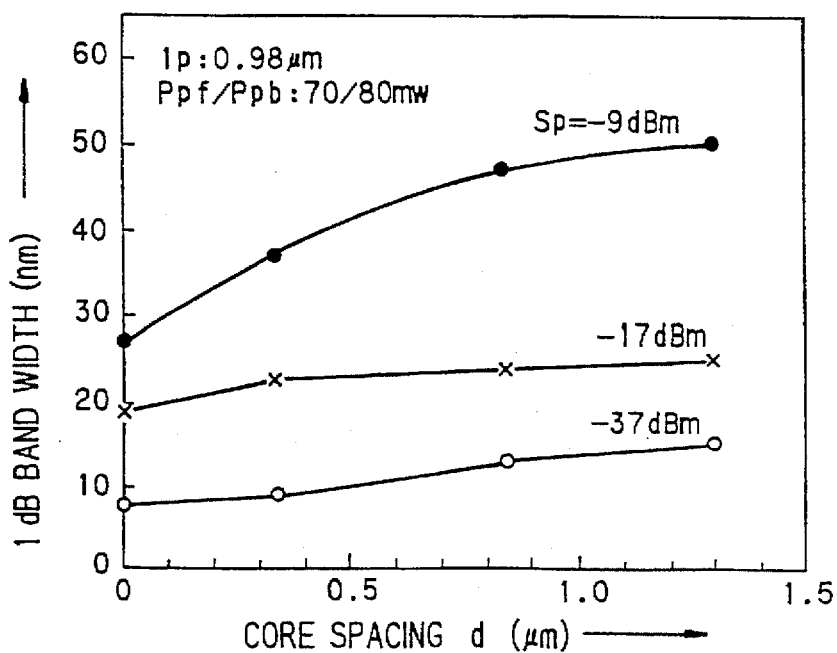
FIG. 4 is a graph showing the characteristics of 1 dB band width to core spacing d for the rare earth element-doped multiple-core optical fiber amplifier shown in FIG. 2.

An Er-doped optical fiber having a diameter of each core of approximately 2 μm, a core spacing d of 1.3 μm, an outer cladding diameter of 125 μm, a specific refractive index difference Δ of 1.45%, a mode-field diameter of approximately 8.8 μm, concentrations of Er and Al dopants in each core of 400 ppm and 8500 ppm, respectively, and a fiber length L of about 45 meter, is used in the optical fiber amplifier. The wavelength 1p of the both pumping lights 14-1 and 14-2 is determined to be 0.98 μm, and the output powers thereof Ppf, Ppb are to be 70 mW and 80 mW, respectively. These figures of pumping lights are determined properly to obtain a flat gain to wavelength characteristics. FIG. 3 shows the characteristics of gain to wavelength, which are obtained for the signal power Sp of −37 dB, −27 dB, −17 dB and −9 dB, respectively. The results show that flat characteristics are obtained in a wide wavelength range. FIG. 4 shows the characteristics of band width when gain drops by 1 dB from the maximum value thereof (1 dB band width) to core spacing d of the Er-doped multiple-core optical fiber, which are obtained for the signal powers Sp of −37 dB, −17 dB and −9 dB, respectively. The characteristics of conventional Er-doped single-core optical fiber are indicated by the case of core spacing d=0. This indicates that the Er-doped multiple-core optical fiber amplifier has flatter gain to wavelength characteristics than the conventional one does, and the larger the core spacing is, the wider 1 dB band width becomes. Even in the Er-doped multiple-core optical fiber amplifier, as mentioned before however, there is a disadvantage in that the characteristics of gain to wavelength become worse and unsatisfactory when a higher gain, such as near 40 dB, need to be obtained.

Figure 5:
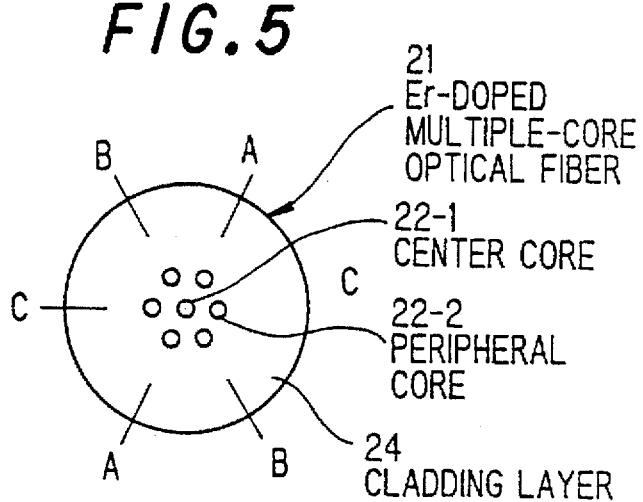
FIG. 5 is a cross-sectional view showing a rare earth element-doped multiple-core optical fiber for a theoretical analysis in the invention.
Figure 6:
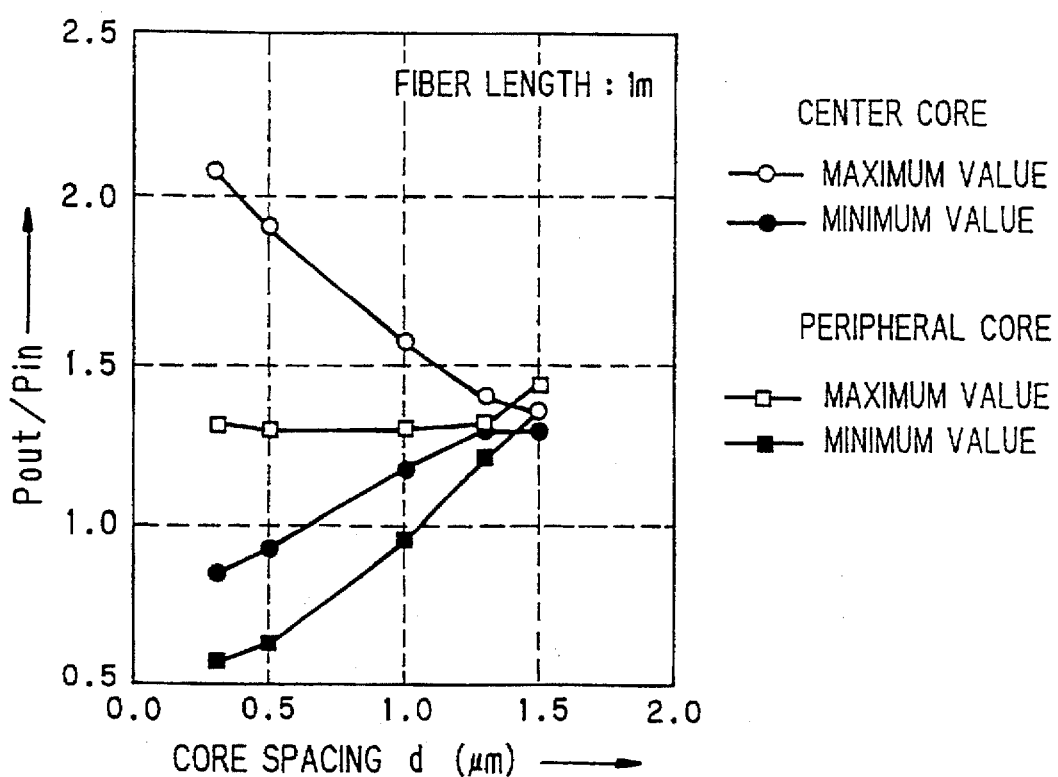
FIG. 6 is a graph showing results of the theoretical analysis of input-output power to core spacing characteristics at the wavelength of 0.98 µm in a rare earth element-doped multiple-core optical fiber shown in FIG. 5.
Figure 7:
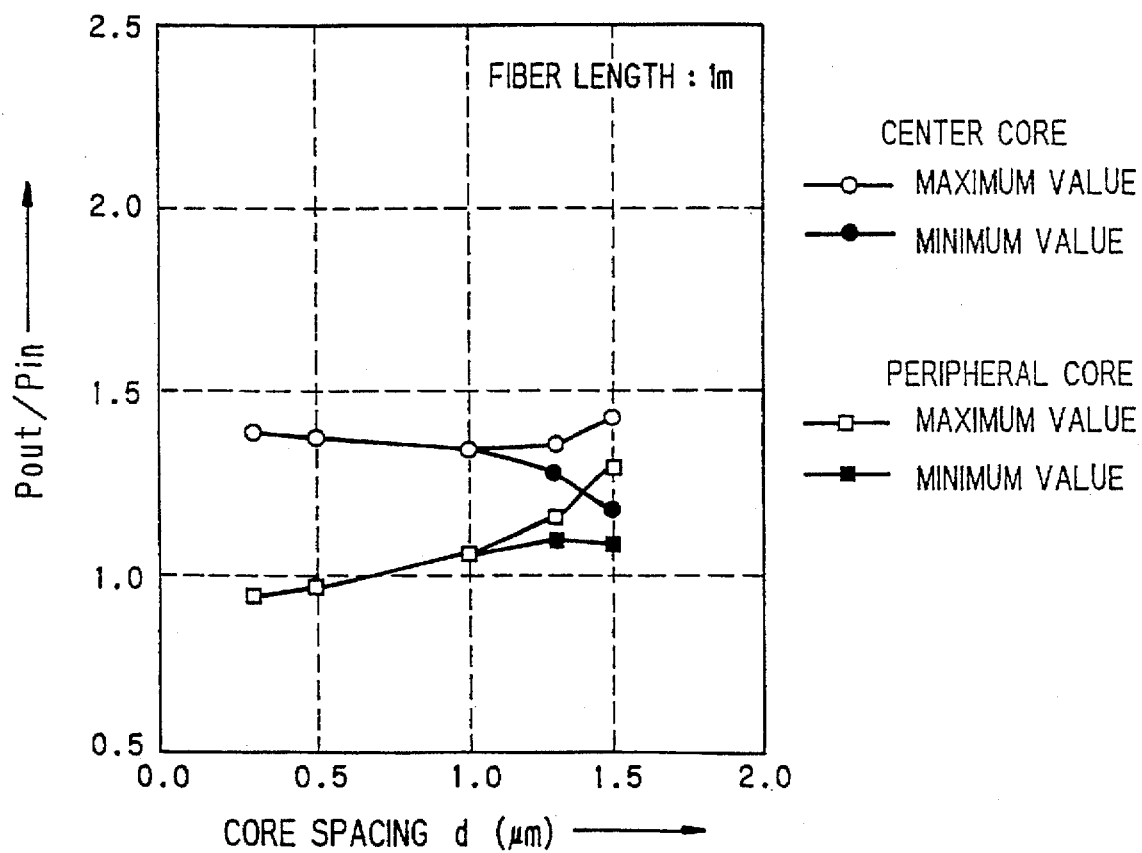
FIG. 7 is a graph showing results of the theoretical analysis of input-output power to core-spacing characteristics at the wavelength of 1.55 µm in a rare earth element-doped multiple-core optical fiber shown in FIG. 5.

Next, referring to FIGS. 5, 6 and 7, how the inventor has made the invention will be explained. Theoretical analyses are made on output power distributions in each core of an Er-doped multiple-core optical fiber 21 shown in FIG. 5, which comprises a center core 22 and six peripheral cores 22-2 having a core spacing of d, respectively, and a cladding layer 24 covering these cores. An pumping light of 0.98 μm wavelength and an input signal light of 1.55 μm are coupled with and propagating through the optical fiber 21 of 1 m long. FIG. 6 and 7 show results of characteristics of input-output power ratio to core spacing based on the theoretical analyses at 0.98 μm and 1.55 μm wavelength, respectively. In the analyses, since the optical fiber 21 is symmetrical on each axis of A—A, B—B and C—C, the input/output power ratio of each peripheral core becomes equal. Therefore, maximum values and minimum values of the power ratio in the center core, and those in the peripheral cores are plotted in graphs shown in FIG. 6 and 7, respectively.

Now, referring to FIG. 6 for the pumping light of 0.98 μm wavelength, there are large differences between maximum values and minimum values of the power ratio in the center core and the peripheral cores, when the core spacing is small. In this case, the pumping light travels through each core with a large oscillation, which cause large unbalanced power distributions in the center core and peripheral cores.

In contrast, the core spacing d becomes as large as 1.3~1.5 µm, the unbalance becomes small, and the power ratio of each core becomes almost equal. A similar tendency is observed in FIG. 7 for the signal light of 1.55 µm wavelength. Therefore, the core spacing d of 1.3~1.5 µm is found to be an optimum value for distributing and propagating the pumping light and the signal light in each core in almost equal power. However, an unbalance of the power still remains, which is thought to make the flat characteristics of gain to wavelength worse to obtain a higher gain, as shown in FIG. 3. According to the invention, the diameter of the center core Dc is smaller than that of the peripheral cores Do so as to lower the power propagating through the center core, whereby the power is almost equal to those propagating through each peripheral core, and the flat characteristics of gain to wavelength are further improved.

Next, a rare earth element-doped optical fiber in a first preferred embodiment according to the invention will be explained by referring to FIG. 8.

In the first preferred embodiment, a rare earth element-doped multiple-core optical fiber 31 comprises a bundle of seven cores 32-1~32-7 co-doped with Er and Al, primary cladding layers 33 covering each core, and an outer cladding layer 34 covering all cores 32-1~32-7, wherein one core 32 being positioned substantially on a central axis of the outer cladding layer and surrounded by other six cores 32-2~32-7. Each peripheral core 32-2~32-7 is separated by the primary cladding layer 34 with a core spacing d1. On the other hand, the center core 32-1 and each peripheral core 32-2~32-7 are separated with a core spacing d2. A refractive index $n_w$ of the core 32-1~32-7 is designed to be higher than a refractive index $n_c$ of the outer cladding layer 34, and a refractive index np of the primary cladding layer 33 is equal to or lower than a refractive index $n_c$ of the outer cladding layer 34, i.e. $n_w > n_c \geq n_p$. A core diameter Dc of the center core 32-1 is smaller than a core diameter Do of each peripheral core 32-2~32-7. In the first embodiment, the power of both signal light (1.53 µm~1.57 µm wavelength bands) and pumping light (0.98 µm or 1.48 µm band) propagating through the center core 32-1 is lower than in the conventional optical fiber shown in FIG. 1. Therefore, the power propagating through each core 32-1~32-7 is equalized, and the flatter characteristics of gain to wavelength are obtained.

Figure 9:
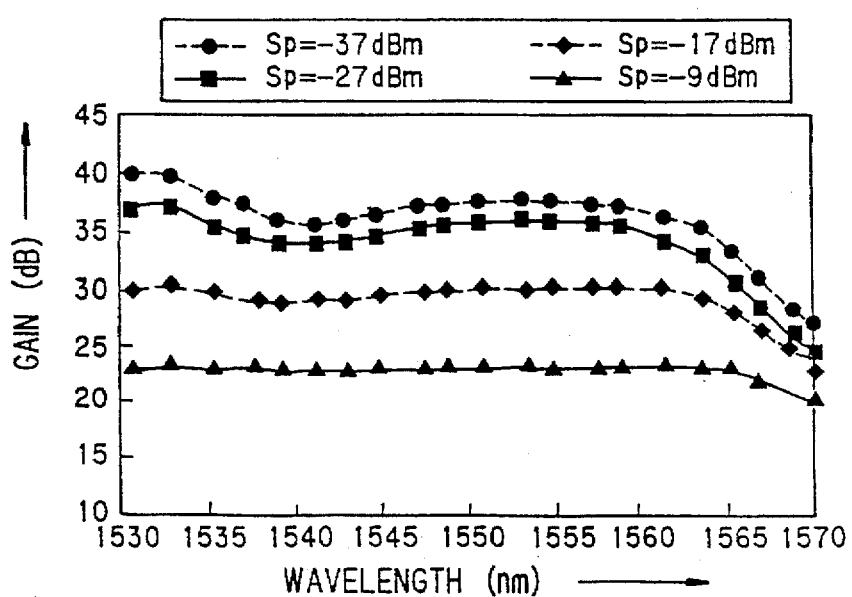
FIG. 9 is a graph showing the characteristics of gain to wavelength for the rare earth element-doped multiple-core optical fiber shown in FIG. 8.
Figure 10:
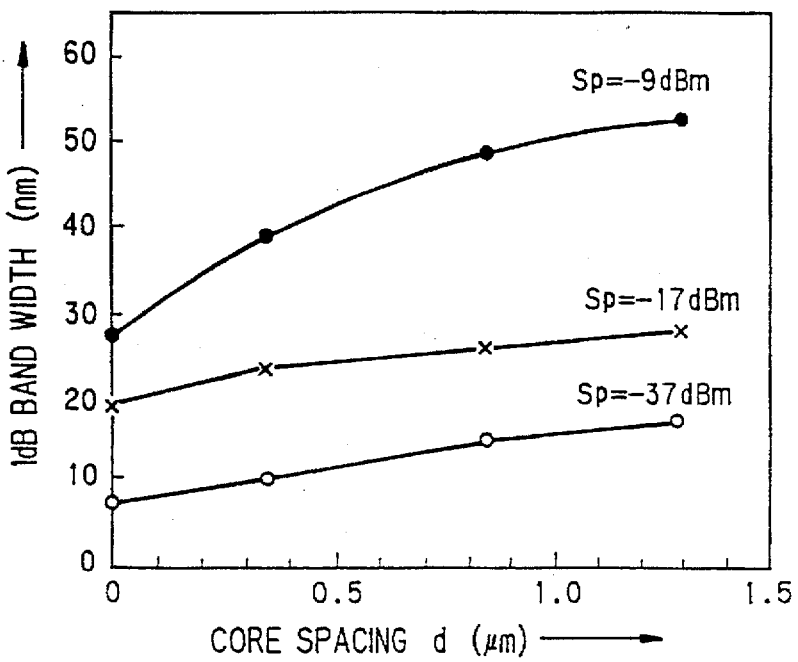
FIG. 10 is a graph showing the characteristics of 1 dB band width to core spacing for the rare earth element-doped multiple-core optical fiber shown shown in FIG. 8.

As an example, an Er-doped multiple-core optical fiber having a outer diameter of outer cladding layer of 125 µm, a center core diameter Dc of about 1.4 µm, a peripheral core diameter Do of about 2 µm, a core spacing d1 between the peripheral cores 32-2~32-7 of about 1.3 µm, a core spacing d2 between the center core 32-1 and each peripheral core 32-2~32-7 of about 1.6 µm is prepared. A refractive index of each core $n_w$ is 1.4795, those of the primary cladding layer and the outer cladding layer $n_c$, $n_p$ are 1.458, and a specific refractive index difference Δbetween the cores and the primary cladding layer is 1.45%. A mode field diameter at 1.55 µm wavelength is about 8.8 µm. The amount of dopants in each core is 400 ppm Er and 8500 ppm Al. Using such optical fiber, the characteristics of gain to wavelength and 1 dB band width to core spacing (d1) are measured on an Er-doped multiple-core optical fiber amplifier having the same structure as shown in FIG. 2. By comparing with the graphs shown in FIGS. 9 and 10 with those in FIGS. 3 and 4, the results clearly indicate that the characteristics of gain to wavelength in higher gain region become flatter than those in the conventional one.

In the first preferred embodiment, the primary cladding layer on the center core 32-1 is designed to be thicker than that on each peripheral core 32-2~32-7 so that each core has the same outer diameter of primary cladding layer 33. In such structure, the Er-doped multiple-core optical fiber according to the invention is easy to manufacture, confines both signal light and pumping light as effectively as possible, and is completed just as it is designed to be. For manufacturing the optical fiber, a bundle of core rods having a primary cladding layer, respectively, are into a quartz tube. The quartz tube is heated by oxyhydrogen-burner from outside thereof, and collapsed to fabricate an optical fiber preform rod without any gaps between the inside wall of the tube and each core. Finally, the optical fiber preform rod is heated, and drawn into an Er-doped multiple-core optical fiber. According to the core configuration and the method mentioned above, core rods are placed in the center of the fiber preform properly and symmetrically, and optical fiber having predetermined equal core spacings is easily obtained.

Figure 8:
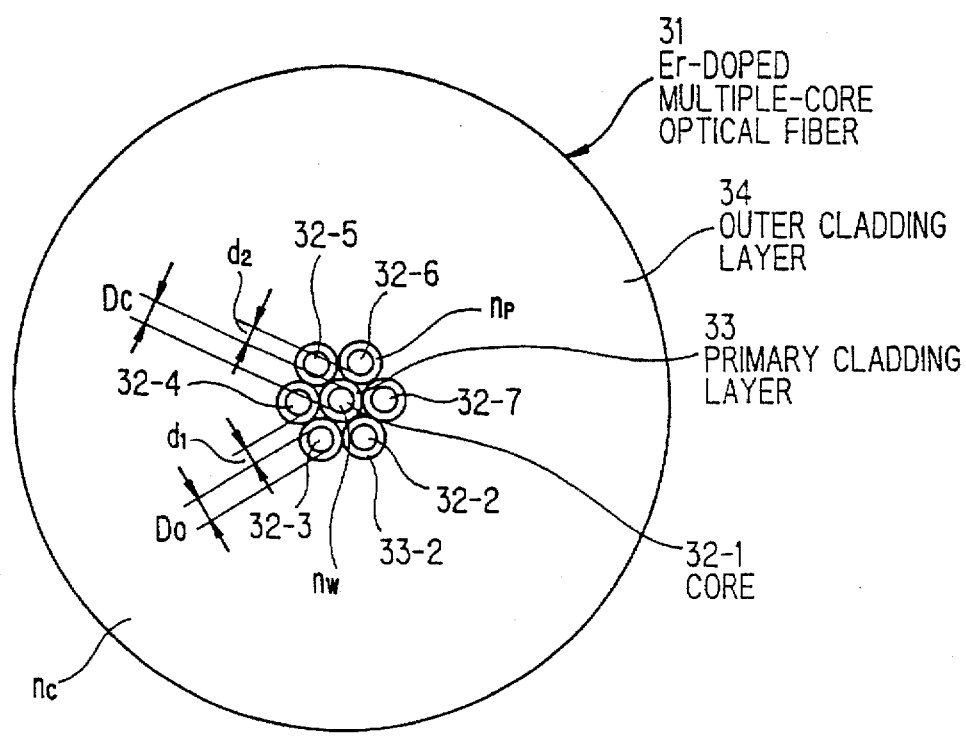
FIG. 8 is a cross-sectional view showing a rare earth element-doped multiple-core optical fiber in a first preferred embodiment according to the invention.
Figure 11:
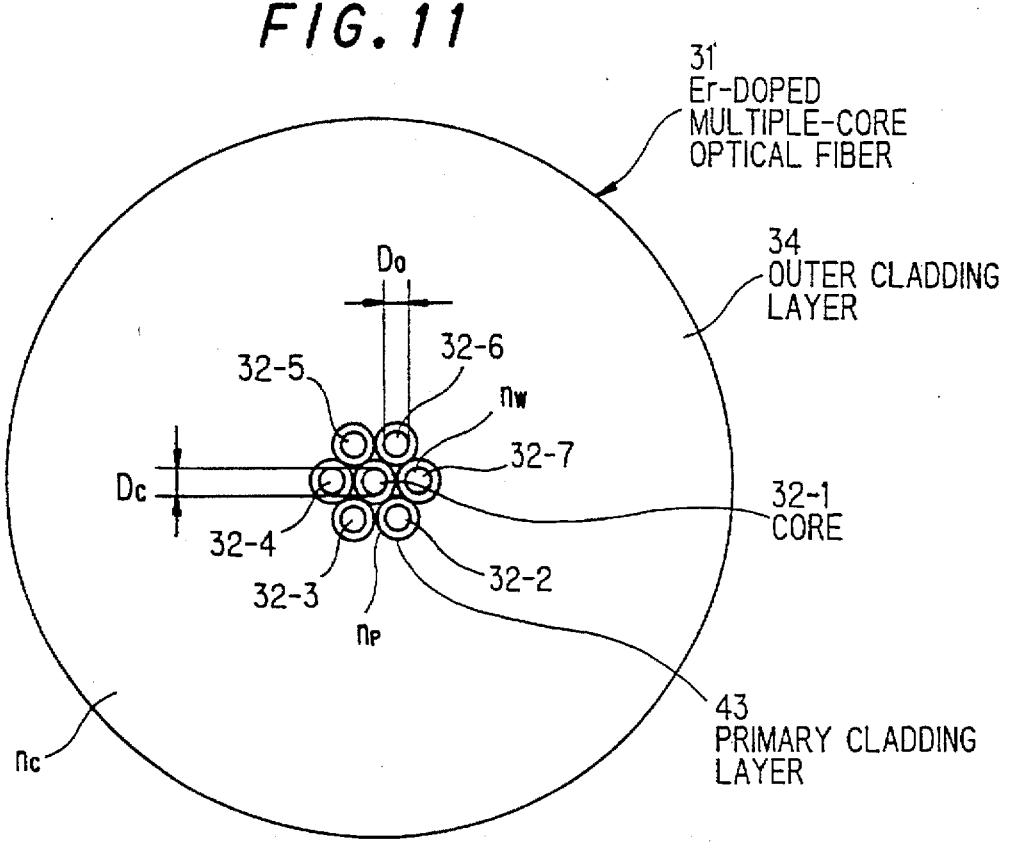
FIG. 11 is a cross-sectional view showing a rare earth element-doped multiple-core optical fiber in a second preferred embodiment according to the invention.

FIG. 11 shows an Er-doped optical fiber in a second preferred embodiment according to the invention, wherein like parts are indicated by like reference numerals as used in FIG. 8. In the second preferred embodiment, the thickness of primary cladding layer 34 of the center core 32-1 is approximately the same as those of the peripheral cores 32-2~32-7. As a result, the outer diameter Dc of the primary cladding layer of the center core 32-1 is smaller the outer diameter Do of the primary cladding layer of the peripheral cores. In the second preferred embodiment, by comparison with the first preferred embodiment, signal light and pumping light are coupled with and propagating through each cores more effectively, and higher gain is obtained.

Figure 12:
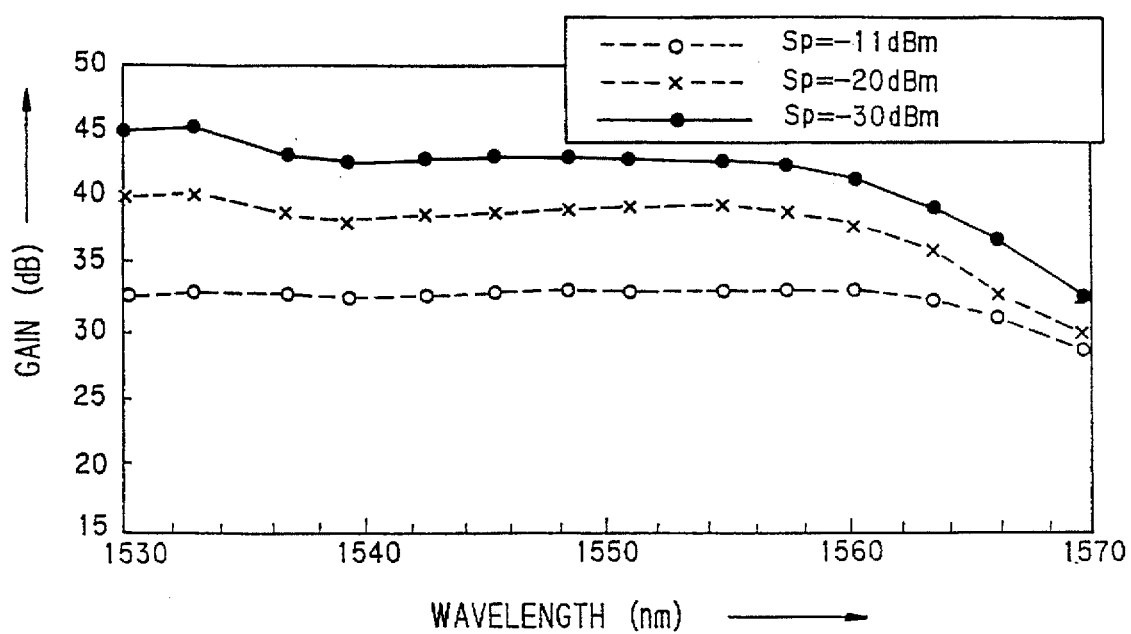
FIG. 12 is a graph showing the characteristics of gain to wavelength for the rare earth element-doped multiple-core optical fiber shown in FIG. 11.

As an example, an Er-doped multiple-core optical fiber having a outer diameter of outer cladding layer of 125 µm, a center core diameter Dc of about 1.4 µm, a peripheral core diameter Do of about 1.9 µm, a core spacing d1 between the peripheral cores 32-2~32-7 of about 1.3 µm, a core spacing d2 between the center core 32-1 and each peripheral core 32-2~32-7 of about 1.4 µm is prepared. A refractive index of each core $n_w$ is 1.481, those of the primary cladding layer and the outer cladding layer $n_c$, $n_p$ are 1.458, and a specific refractive index difference Δ between the cores and the primary cladding layer is 2.19 %. A mode field diameter at 1.55 µm wavelength is about 5.2 µm. The amount of dopants in each core is 400 ppm Er and 17000 ppm Al. Using such optical fiber, the characteristics of gain to wavelength are measured on an Er-doped multiple-core optical fiber for the signal light power Sp of −11 dBm, −20 dBm and −30 dBm, respectively. As a result, the maximum gain of 45 dB at 1.533 wavelength is obtained, as shown in FIG. 12. By comparing with the graphs shown in FIG. 12 with those in FIG. 9, the results clearly indicate that the characteristics of gain to wavelength in higher gain region become much flatter than those in the first preferred embodiment.

Figure 13:
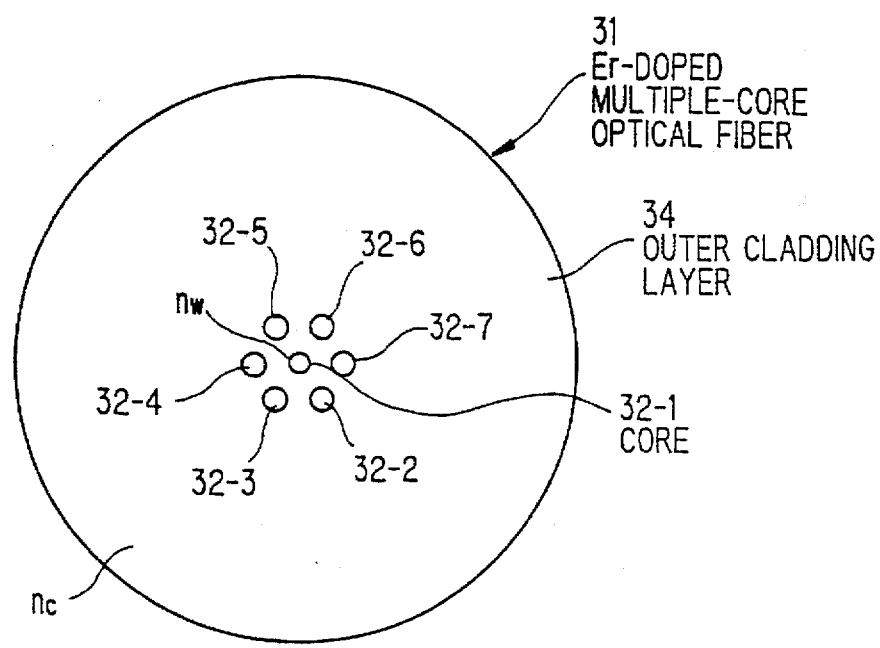
FIG. 13 is a cross-sectional view showing a rare earth element-doped multiple-core optical fiber in a third preferred embodiment according to the invention.

FIG. 13 shows an Er-doped multiple-core optical fiber in a third preferred embodiment according to the invention, wherein like part are indicated by like reference numerals as used in FIG. 8. In the third preferred embodiment, since primary cladding layers and an outer cladding layer are made of the same material, such as $SiO_2$, it looks as if the primary cladding layers are removed (Therefore, the primary cladding layers are not shown in FIG. 13). According to the embodiment, manufacturing of an optical fiber becomes easy.

Figure 14:
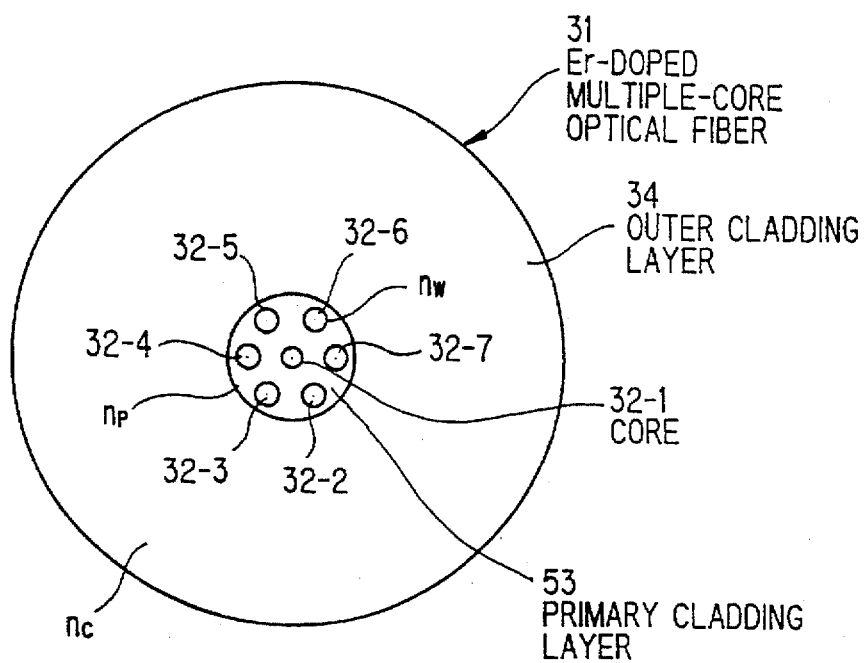
FIG. 14 is a cross-sectional view showing a rare earth element-doped multiple-core optical fiber in a fourth preferred embodiment according to the invention.

FIG. 14 shows an Er-doped multiple-core optical fiber in a fourth preferred embodiment according to the invention, wherein like parts are indicated by like reference numerals as used in FIGS. 8, 11 and 13. In the fourth preferred embodiment, cores 32-1~31-7 are covered by a common primary cladding layer 53, an outer cladding layer 34 covers the primary cladding layer 53. This structure is suitable for realizing an optical fiber having different refractive indices between the primary cladding layer and the outer cladding layer. For example, if the primary cladding layer is made of F-doped $SiO_2$, a larger specific refractive index difference is may be chosen, thereby higher gain is obtained.

According to the first feature of the invention, as explained above, the diameter of peripheral cores is larger than that of a center core. On the other hand, according to the second feature of the invention, the same results are obtained by making a refractive index of peripheral cores lower than that of a center core so as to lower the power propagating through the center core. Accordingly, the power is almost equal to those propagating through each peripheral core, and the flat characteristics of gain to wavelength are further improved.

Figure 15A:
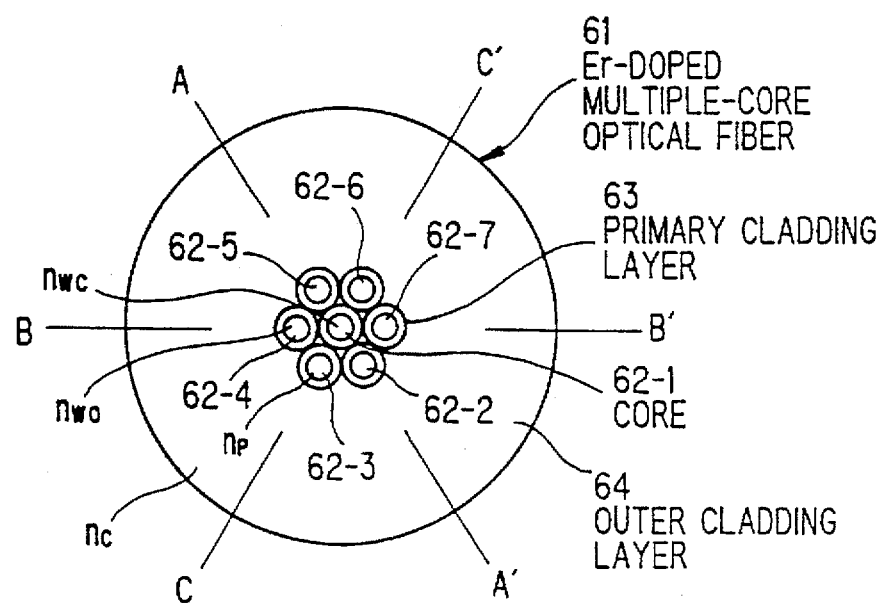
FIG. 15A and 15B are for a cross-sectional view showing a rare earth element-doped multiple-core optical fiber in a fifth preferred embodiment according to the invention, and a refractive index profile taken along the line A-A', B-B', or C-C'.
Figure 15B:
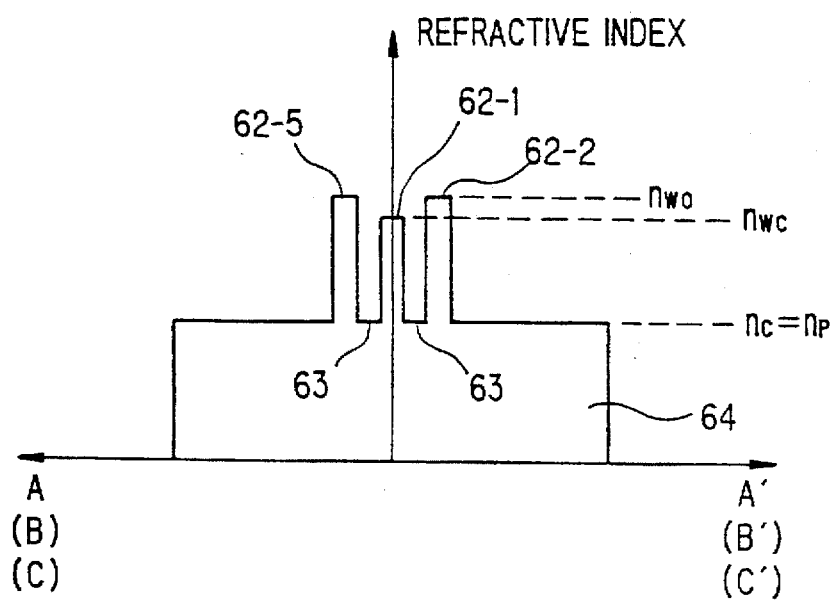

FIGS. 15A and 15B show an Er-doped multiple-core optical fiber in a fifth preferred embodiment according to the invention. In the fifth preferred embodiment, a rare earth element-doped multiple-core optical fiber 61 comprises a bundle of seven cores 62-1~62-7 co-doped with Er and Al, primary cladding layers 63 covering each core, and an outer cladding layer 64 covering all cores 62-1~62-7, wherein one core 62-1 being positioned substantially on a central axis of the outer cladding layer and surrounded by other six cores 62-2~62-7. Each peripheral core 62-2~62-7 is separated by the primary cladding layer 64. The center core 32-1 and each peripheral core 32-2~32-7 are also separated by the primary cladding layer 64. A refractive index $n_{wo}$ of each peripheral core 62-2~62-7 is designed to be higher than a refractive index $n_{wc}$ of the center core 62-1. A refractive index nc of the outer cladding layer 34 is lower than $n_{wo}$, and a refractive index $n_p$ of the primary cladding layer 33 is equal to i.e. $n_{wo} > n_{wc} > n_c = n_p$ as shown in FIG. 15B. In the embodiment, the power of both signal light (1.53 µm~1.57 µm wavelength bands) and pumping light (0.98 µm or 1.48 µm band) propagating through the center core 62-1 is lower than in the conventional optical fiber shown in FIG. 1. Therefore, the power propagating through each core 62-1~62-7 is equalized, and the flatter characteristics of gain to wavelength are obtained. In the embodiment, Er-doped $SiO_2$—$GeO_2$—$Al_2O_3$ may be used as a core material, and SiO2 may be used as a primary cladding layer and an outer cladding layer material.

Figure 16:
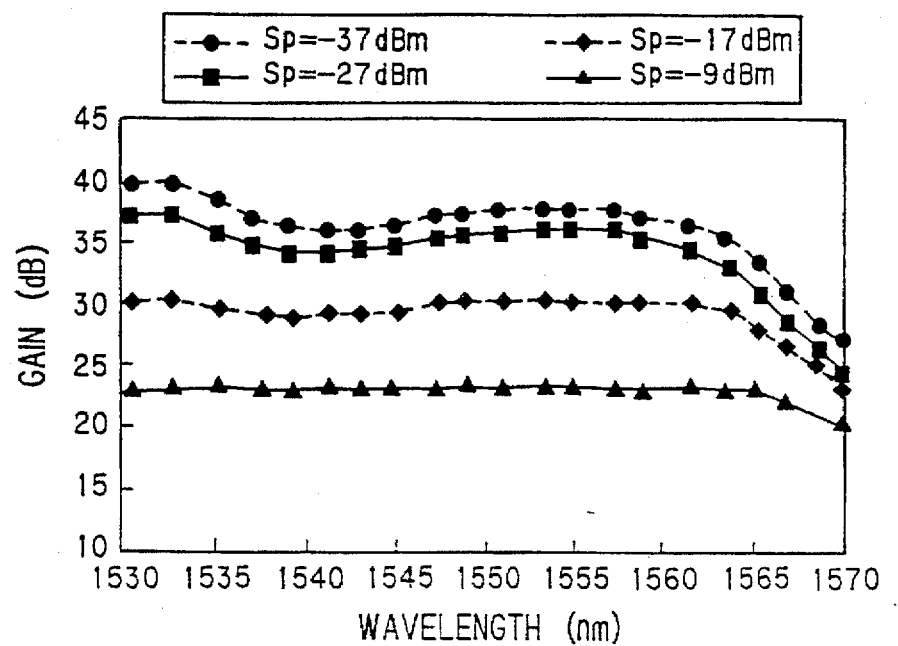
FIG. 16 is a graph showing the characteristics of gain to wavelength for the rare earth element-doped multiple-core optical fiber shown in FIG. 15A.
Figure 17:
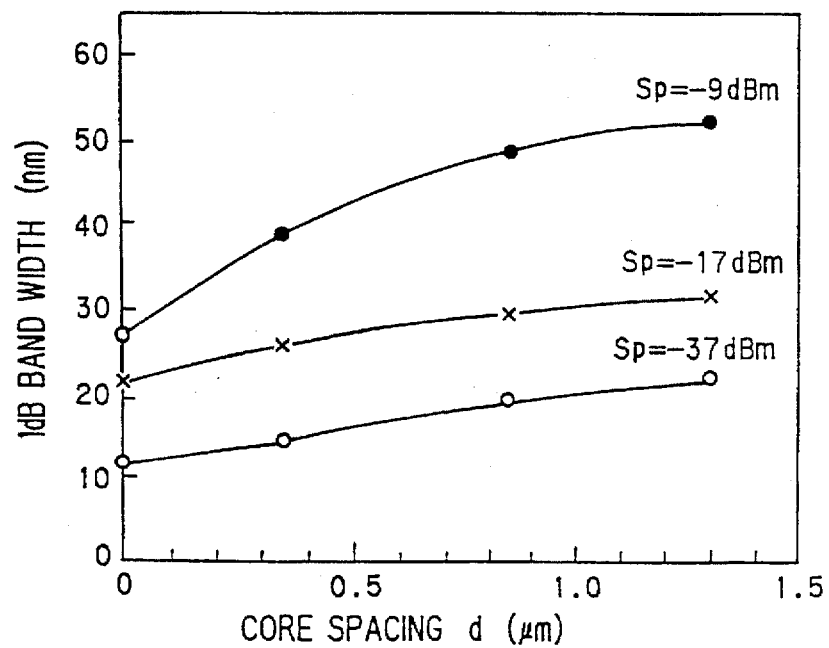
FIG. 17 is a graph showing the characteristics of 1 dB band width to core spacing for the rare earth element-doped multiple-core optical fiber shown shown in FIG. 15A, FIG. 18A and 18B are for cross-sectional views showing a rare earth element-doped multiple-core optical fiber in a sixth preferred embodiment according to the invention, and a refractive index profile taken along the line A-A', B-B', or C-C'.

As an example, an Er-doped multiple-core optical fiber having a having a outer diameter of outer cladding layer of 125 µm, a center core and each peripheral core diameter of about 1.9 µm, a core spacing d between each peripheral core of about 1.3 µm is prepared. A refractive index of the center core $n_{wc}$ is 1.478, that of each peripheral core is 1.4795, those of the primary cladding layer and the outer cladding layern $n_c$ $n_p$ are 1.458. The amount of dopants in each core is 400 ppm Er and 8500 ppm Al. The core spacing (d=1.3 µm) is changed by adjusting the thickness of the primary cladding layer. Using such optical fiber, the characteristics of gain to wavelength and 1 dB band width to core spacing (d) are measured on an Er-doped multiple-core optical fiber amplifier having the same structure as shown in FIG. 2 By comparing with the graphs shown in FIGS. 16 and 17 with those in FIGS. 3 and 4, the results clearly indicate that the characteristics of gain to wavelength in higher gain region become flatter than those in the conventional one. That is to say, the gain to wavelength characteristics for a small signal light power (Sp=−37 dBm) becomes flatter, as shown in FIG. 16, and the 1 dB band width is expanded from about 15 nm to about 22 nm, as shown in FIG. 17. By increasing the amount of Al dopant in each core to 17000 ppm, the 1 dB band width is expanded to about 26 nm for the same Sp=−37 dBm.

Figure 18A:
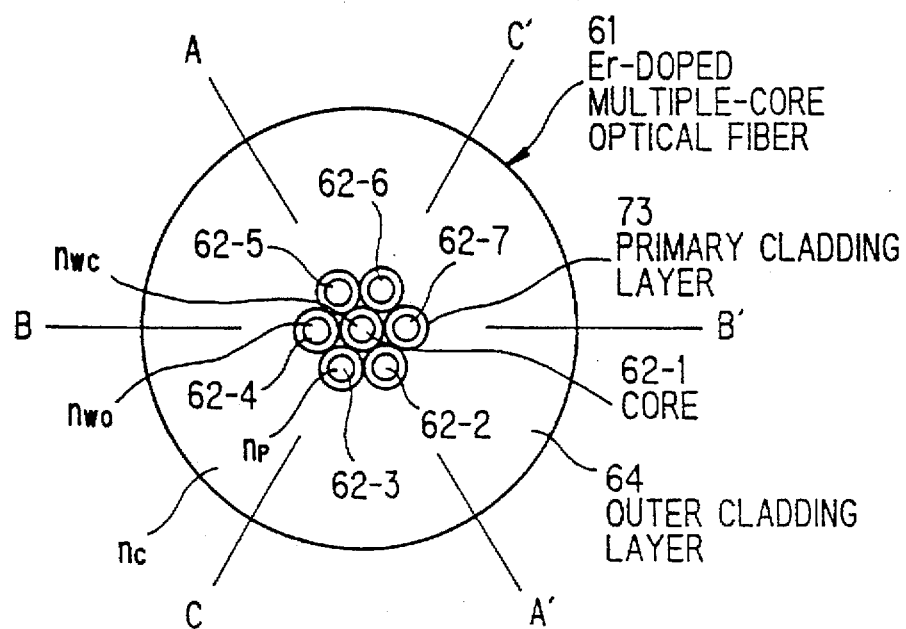
Figure 18B:
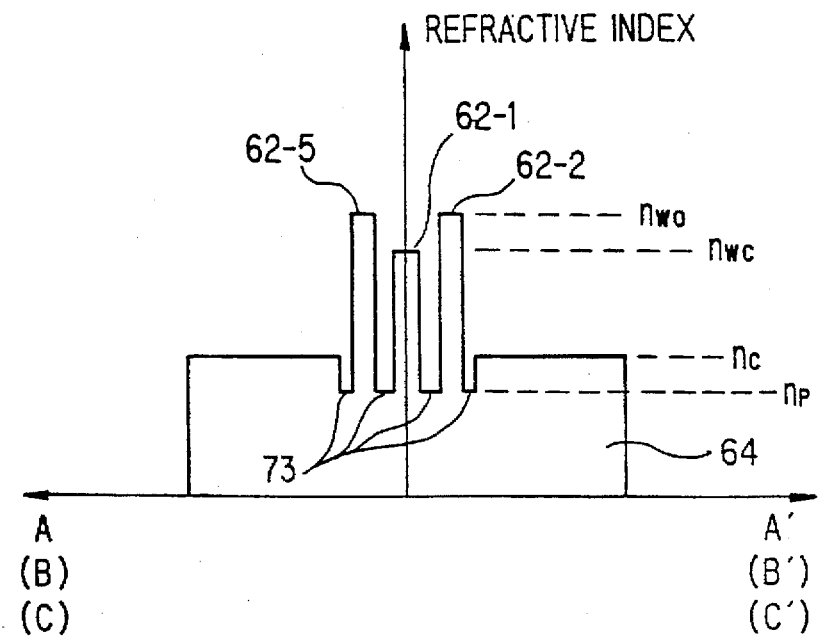

FIGS. 18A and 18B shows an Er-doped multiple-core optical fiber in a sixth preferred embodiment according to the invention, wherein like parts are indicated by like reference numerals as used in FIGS. 16A and 16B. In the sixth embodiment, the difference from the fifth embodiment is that a refractive index of an outer cladding layer 64 is not equal to that of a primary cladding layer 73 but the former is designed to be higher that the latter ($n_c > n_p$). For example, ifn $n_c$ is determined to be 1.458, $n_p$ is to be 1.448 by adding fluorine into the primary cladding layer. In this case, a specific refractive index difference between each peripheral core and the primary cladding layer $\Delta$ o is 2.15%, and that between the center core and the primary cladding layer $\Delta$ c is 2.03%, which are larger than that in the first preferred embodiment. As a result, the gain becomes higher by about 2 dB than that in the first preferred embodiment, and almost the same value of 1 dB band width is obtained as well. In the embodiment, Er-doped $SiO_2$—$GeO_2$—$Al_2O_3$ may be used as a core material, and F-doped $SiO_2$ and $SiO_2$ may be used as a primary cladding layer and an outer cladding layer, respectively.

Figure 19A:
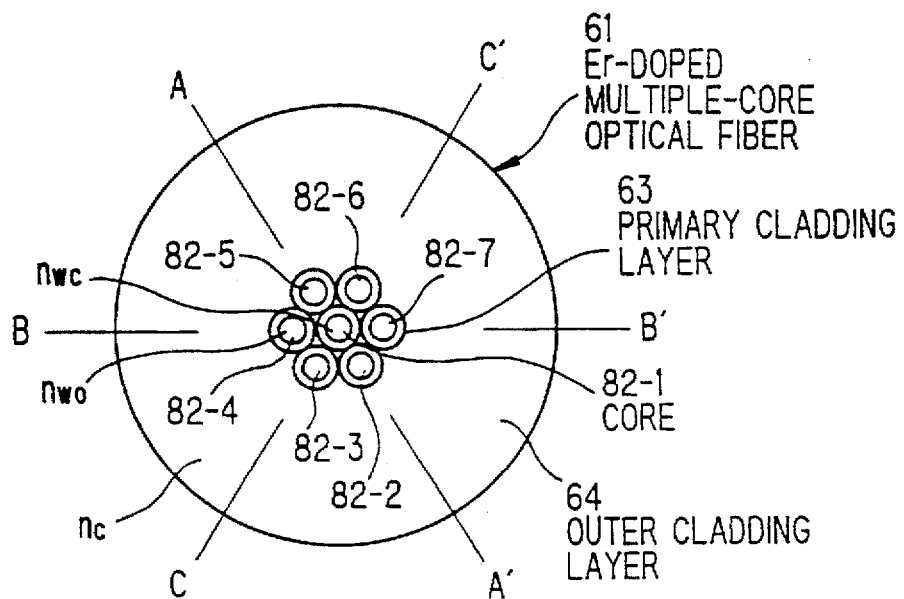
FIG. 19A and 19B are for cross-sectional views showing a rare earth element-doped multiple-core optical fiber in a seventh preferred embodiment according to the invention, and a refractive index profile taken along the line A-A', B-B', or C-C'.
Figure 19B:
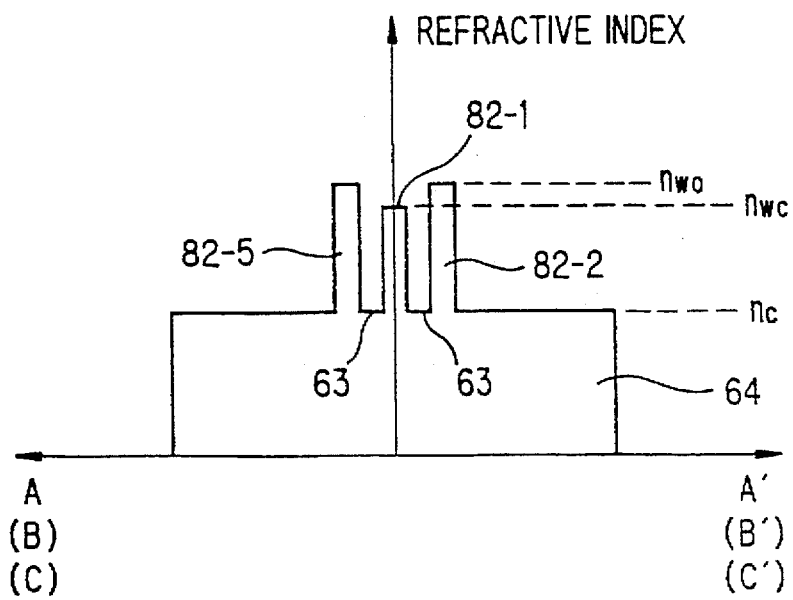

FIGS. 19A and 19B show an Er-doped multiple-core optical fiber in a seventh preferred embodiment according to the invention, wherein like parts are indicated by like reference numerals as used in FIGS. 15A, 15B, 18A and 18B. In the seventh embodiment, cores 82-1~82-7 are mainly made of $SiO_2$—$Al_2O_3$. Explaining in detail, the center core 82-1 comprises an Er-doped $SiO_2$—$Al_2O_3$, and each peripheral cores 82-2~82-7 comprises an Er-doped $SiO_2$—$Al_2O_3$ which contains almost the same amount of $Al_2O_3$ as in the center core and a small amount of $GeO_2$ or $P_2O_5$ for adjusting the refractive index thereof. The amount of $Al_2O_3$ in each core 82-1~82-7 is preferably as much as possible (60000 ppm maximum). $P_2O_5$ may be added into the center core 82-1. As a possible maximum refractive index of $SiO_2$—$Al_2O_3$ glass is about 1.478, specific refractive index difference $\Delta$ is not able to increase so much. If necessary, the primary cladding layer may comprise F-doped $SiO_2$ so that the refractive index thereof is to be lowered. In the embodiment the characteristics of gain to wavelength become further flatter as well. $P_2O_5$ may be useful for doping more Er into the cores more uniformly.

Figure 20A:
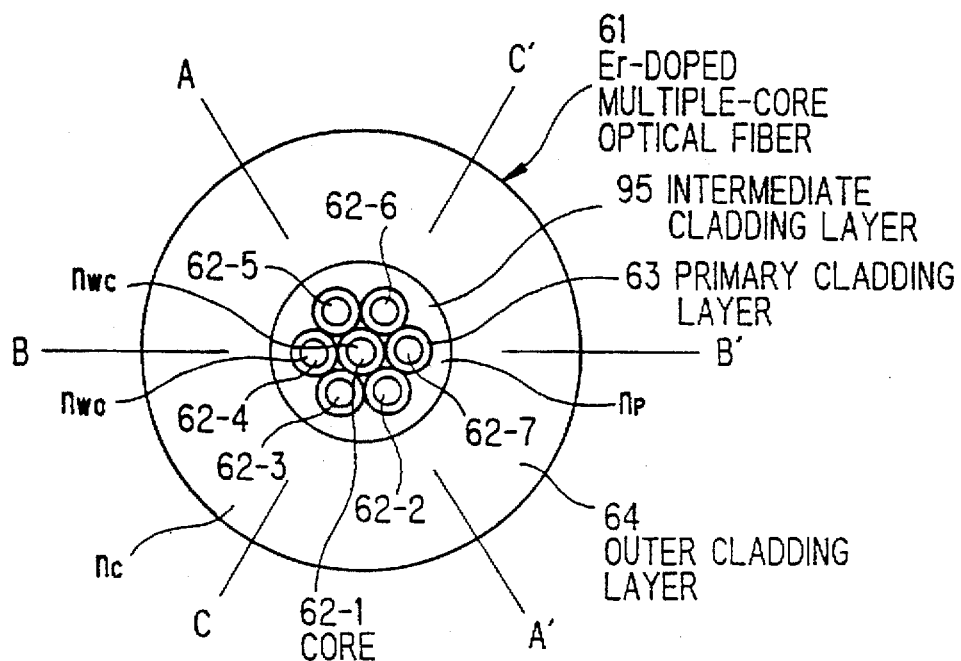
FIG. 20A and 20B are for cross-sectional views showing a rare earth element-doped multiple-core optical fiber in a eighth preferred embodiment according to the invention, and a refractive index profile taken along the line A-A', B-B', or C-C'.
Figure 20B:
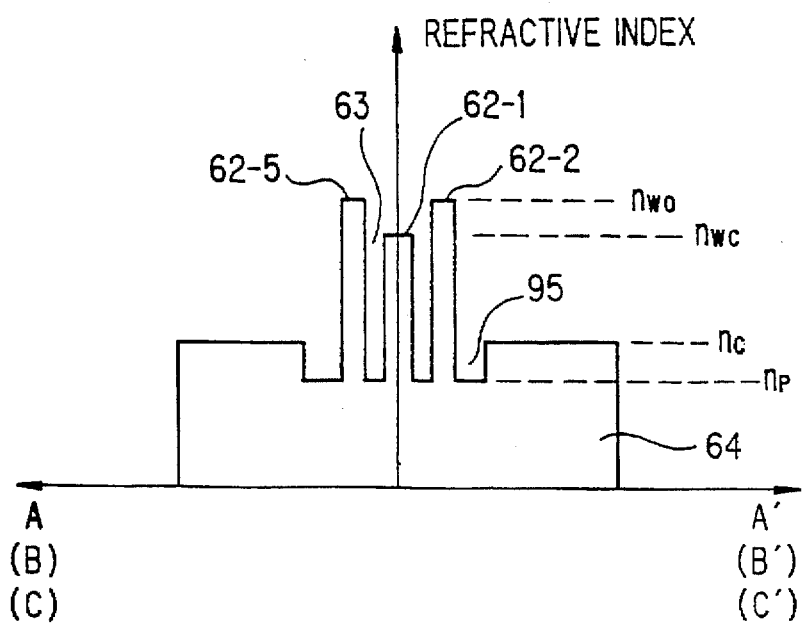

FIGS. 20A and 20B show an Er-doped multiple-core optical fiber in a eighth preferred embodiment, wherein like parts are indicated by like reference numerals as used in FIGS. 15A, 15B, 18A, 18B, 19A and 19 B. In the eighth embodiment, a bundle of cores 61-1~62-2 covered by a primary cladding layer 63, respectively, are further covered by an intermediate cladding layer 95, and an outer cladding layer 64 covers the intermediate cladding layer 95. F-doped $SiO_2$ is used as the intermediate cladding layer 95, a diameter thereof is preferably 10~100 µm. According to the embodiment, specific refractive index difference becomes high, both signal light and pumping light are confined in each core more effectively.

Figure 21:
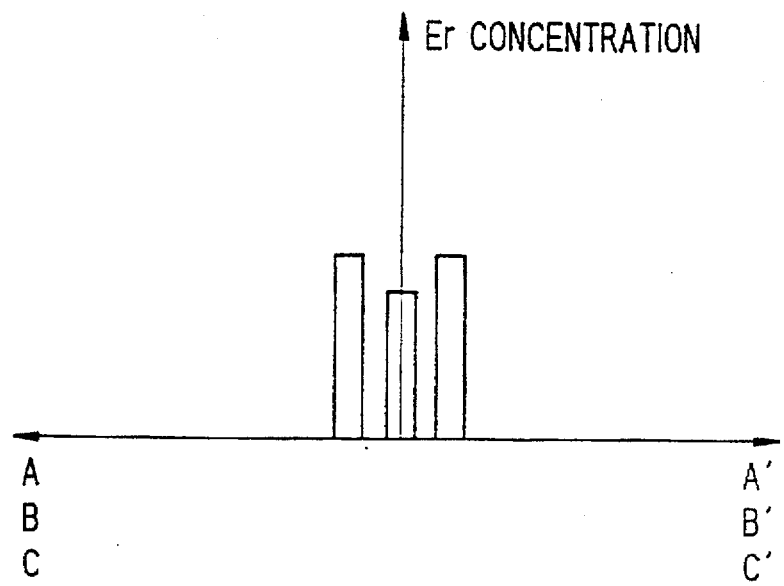
FIG. 21 and 22 are graphs showing two types of distributions of Er concentrations in a core of a rare earth element-doped multiple-core optical fiber in the invention.
Figure 22:
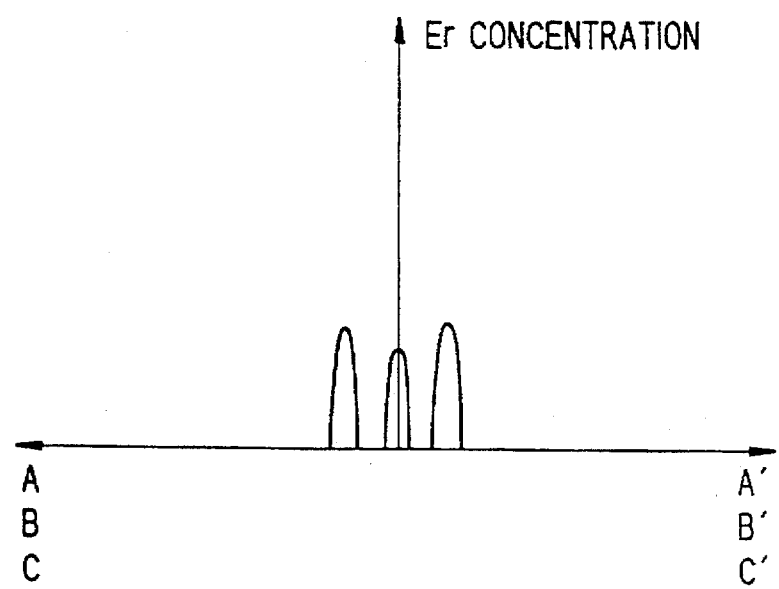

Although, in the fifth, sixth, seventh, eighth preferred embodiments, a refractive index in each core have a step index profile, as shown in FIGS. 15B, 18B, 19B and 20B, the invention is not limited such index profile but may have a profile which is gradually distributing in radial direction. Refractive indices of a primary cladding layer and an intermediate cladding layer may have such profiles as well. FIGS. 21 and 22 show examples of distributions of Er concentration in cores in the fifth, sixth, seventh, eighth preferred embodiments. Either a step-shaped distribution or a gradual distribution in radial direction of Er concentration may be applicable.

According to the third feature of the invention, the same results are obtained by only making a concentration of Er in each peripheral core less than that in a center core so that an amplification degree determined by the power of signal light and pumping light propagating through a center core is almost equal to those determined by the power of signal light and pumping light propagating through each peripheral core. As a result, the flat characteristics of gain to wavelength are further improved.

In the invention, combining the former means in which refractive indices of cores are control and the latter means in which Er concentrations are control. That is to say, a refractive index of the center core is lower than that of each peripheral core so that the power of signal light and pumping light propagating through the center core is suppressed. At the same time, the concentration of Er doped into the center core is less than that doped into each peripheral core so that the amplification degree in the center core is a little suppressed. As a result, the amplification degree for signal light in each core is to be equalized. According to such combination, a degree of freedom for designing an Er-doped multiple-core optical fiber expands. For example, in order to obtain certain characteristics, the degree of lowering the refractive index of the center core and the degree of decreasing the Er dopant may be combined in various combinations. If the former is small, the latter is increased, and vice versa.

Next, optical systems using an Er-doped multiple-core optical fiber in the invention will be explained.

Figure 23:
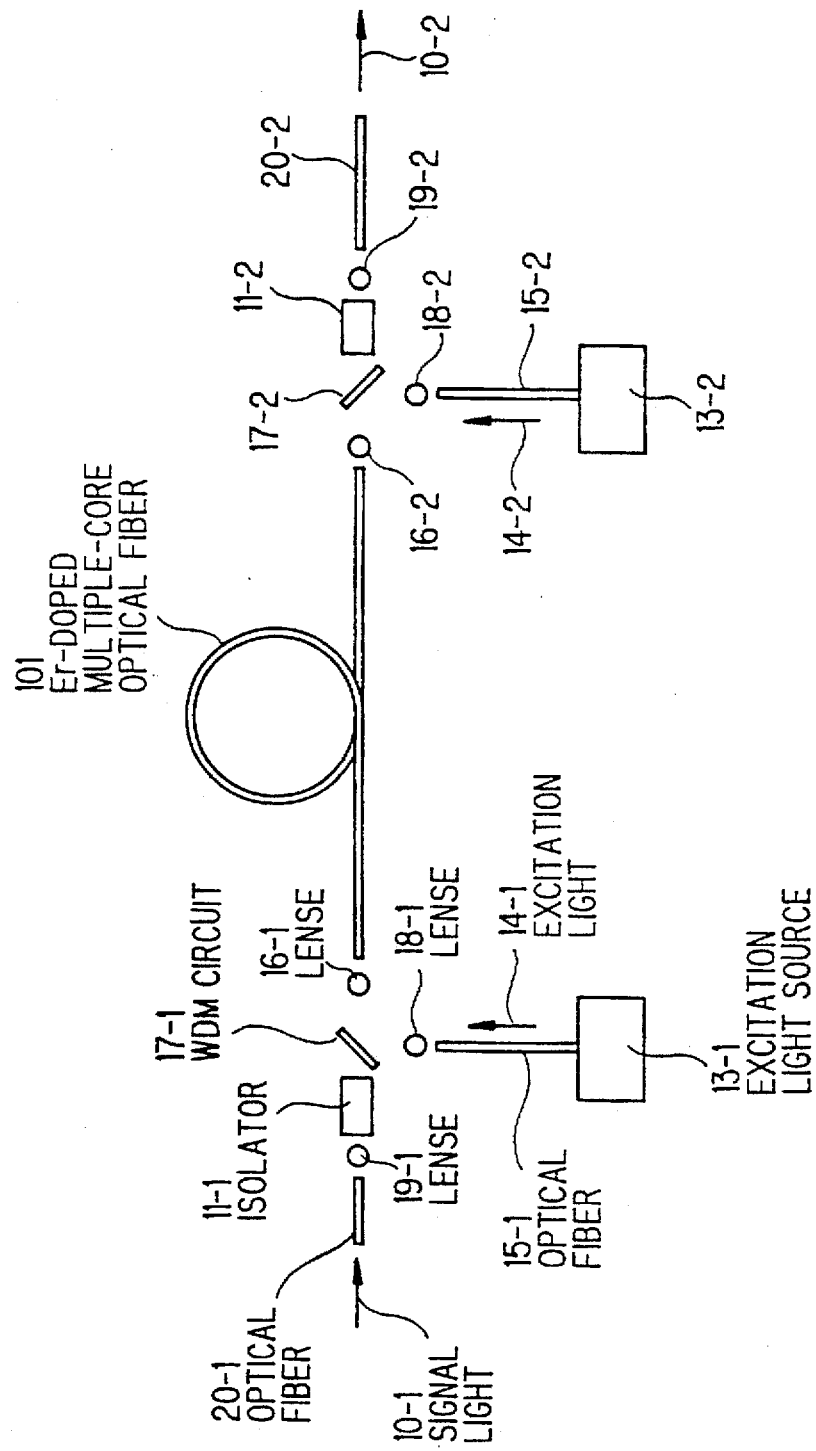
FIG. 23 is a structural view showing an optical fiber amplifier in a first preferred embodiment according to the invention.

FIG. 23 shows an Er-doped multiple-core optical fiber amplifier in a first preferred embodiment according to the invention. The Er-doped multiple-core optical fiber amplifier comprises an Er-doped multiple-core optical fiber 101, which is selected among the Er-doped multiple-core optical fibers in the first through eighth preferred embodiments in the invention, WDM circuit 17-1 and 17-2 connected to both end of the optical fiber 101 through lenses 16-1 and 16-2, respectively, pumping light sources 13-1 and 13-2 for emitting pumping lights 14-1 and 14-2, respectively, and optical isolators 11-1 and 11-2 having a bulk structure, which are disposed at input side and output side of the WDM circuits 17-1 and 17-2, respectively. optical fibers 15-1, 15-2 for guiding the pumping lights 14-1, 14-2 are connected to the reflection side of the WDM circuits 17-1 through lenses 18-1, 18-2, respectively, and the output end an optical fiber 20-1 and the input end of an optical fiber 20-2 are connected to the input end of the isolator 11-1 and the output end of the isolator 11-2 through lenses 19-1, 19-2, respectively. These lenses are used for transforming non-parallel lights of into parallel lights. The WDM circuits 17-1 and 17-2 comprises interference film filter made of a glass substrate on which $SiO_2$ film and $TiO_2$ film (low refractive index film and high refractive index film) are alternatively formed, by which the signal lights are propagating and the pumping lights are reflected. Neither optical fiber isolators nor optical fiber WDM circuits are used in the embodiment. Because, in order to connect such fiber type parts to an Er-doped multiple-core optical fiber having a large specific refractive index difference $\Delta$, mode field matching circuits are necessary, thereby loss of power occurs.

In operation, the pumping lights 14-1 and 14-2, such as semiconductor lasers, are coupled with the Er-doped multiple-core optical fiber 1 through optical fibers 15-1 and 15-2, and the WDM circuits 17-1 and 17-2, while a signal light 10-1 is input into the optical fiber 1 through the optical fiber 20-1, the isolator 11-1 and the WDM circuit 17-1. The pumping lights are absorbed in the optical fiber 1 inherently, the certain energy levels of Er ions are excited, and amplification occurs due to stimulated emission. The signal light 10-1 propagating through the optical fiber 1 is amplified in the optical fiber 1 and output as an amplified signal light 10-2 through the WDM circuit 17-2, the isolator 11-2 and the optical fiber 20-2. In the invention, at least one pumping light 14-1 or 14-2 may be coupled with the optical fiber, and 0.98 µm and/or 1.48 µm wavelength light may be used.

As an example, an Er-doped multiple-core optical fiber having a core spacing d of 1.3 µm, each core diameter of about 2 µm, an outer cladding layer diameter of 125 µm, a specific refractive index difference between cores and primary cladding layers of 1.45%, a mode field diameter of about 8.8 µm, the amount of dopants of 400 ppm Er and 8500 ppm Al is prepared. The wavelength of the both pumping lights 14-1 and 14-2 is determined to be 0.98 µm, and the output powers thereof are to be 70 mW and 80 mW, respectively. These figures of pumping lights are determined properly to obtain a flat gain to wavelength characteristics.

Figure 24:
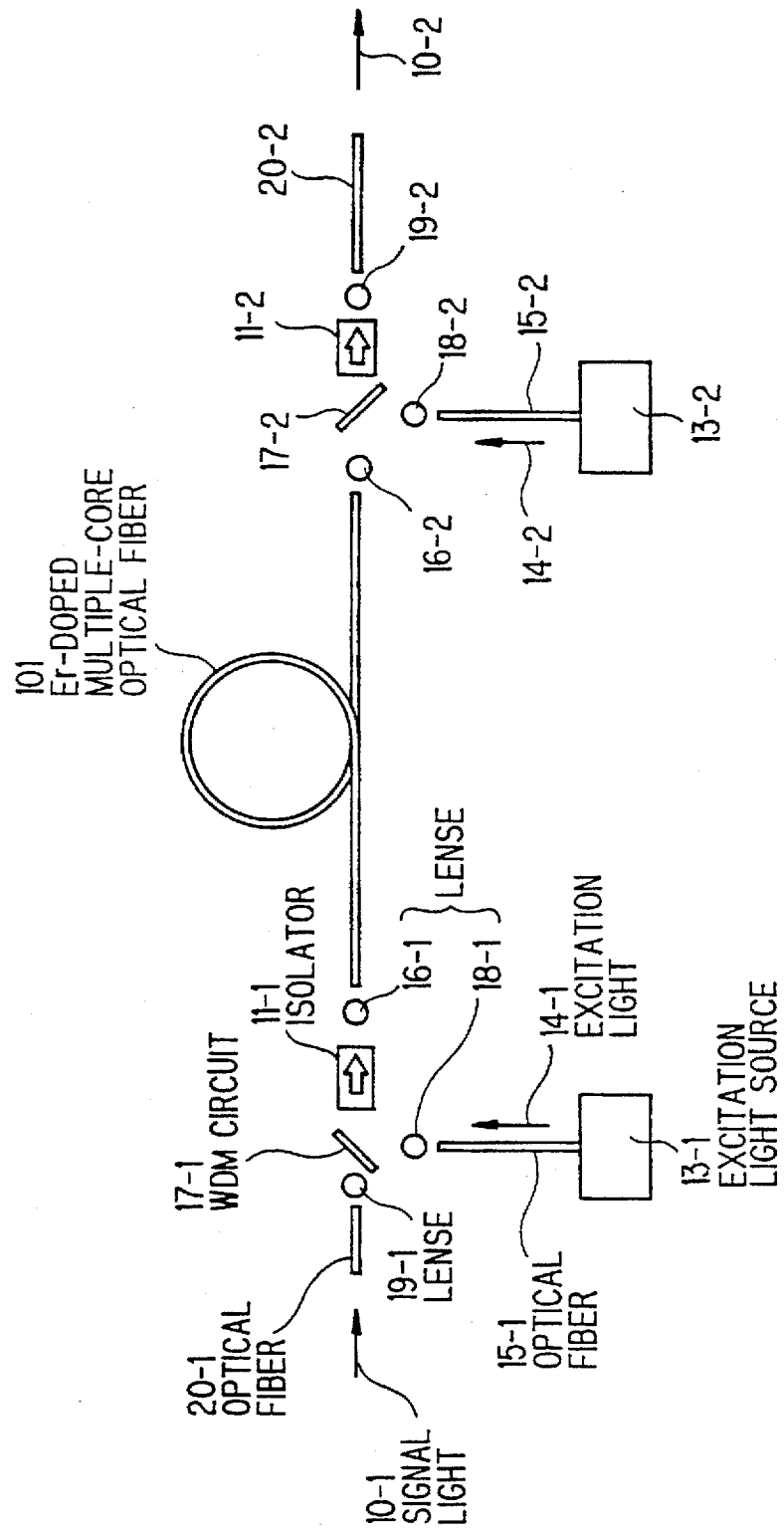
FIG. 24 is a structural view showing an optical fiber amplifier in a second preferred embodiment according to the invention.

FIG. 24 shows an Er-doped multiple-core optical fiber amplifier in a second preferred embodiment according to the invention, wherein like parts are indicated by like reference numerals as used in FIG. 23. In the second preferred embodiment, the order of the isolators 11-1, 11-2 and the WDM circuits 17-1, 17-2 in FIG. 23 is reversed, respectively. In the embodiment, the isolator 11-1 need to be such isolator that both signal lights (1.53~1.56 µm wavelength bands) and pumping lights (0.98 µm or 1.48 µm band) can be transmitted. As the isolators 11-1, 11-2 are disposed at the output side of the WDM circuits 17-1, 17-2, not only reflected signal lights from the Er-doped multiple-core optical fiber 101 but also reflected pumping lights are isolated. Therefore, a signal light source (not shown) and the pumping light source 13-1 are operated stably. Moreover, As the pumping light 14-2 propagating through the Er-doped multiple-core optical fiber 101 is reflected by the isolator 11-1 and propagates through the optical fiber 101 again, the pumping light contributes the amplification more effectively, and higher gain is obtained.

Figure 25:
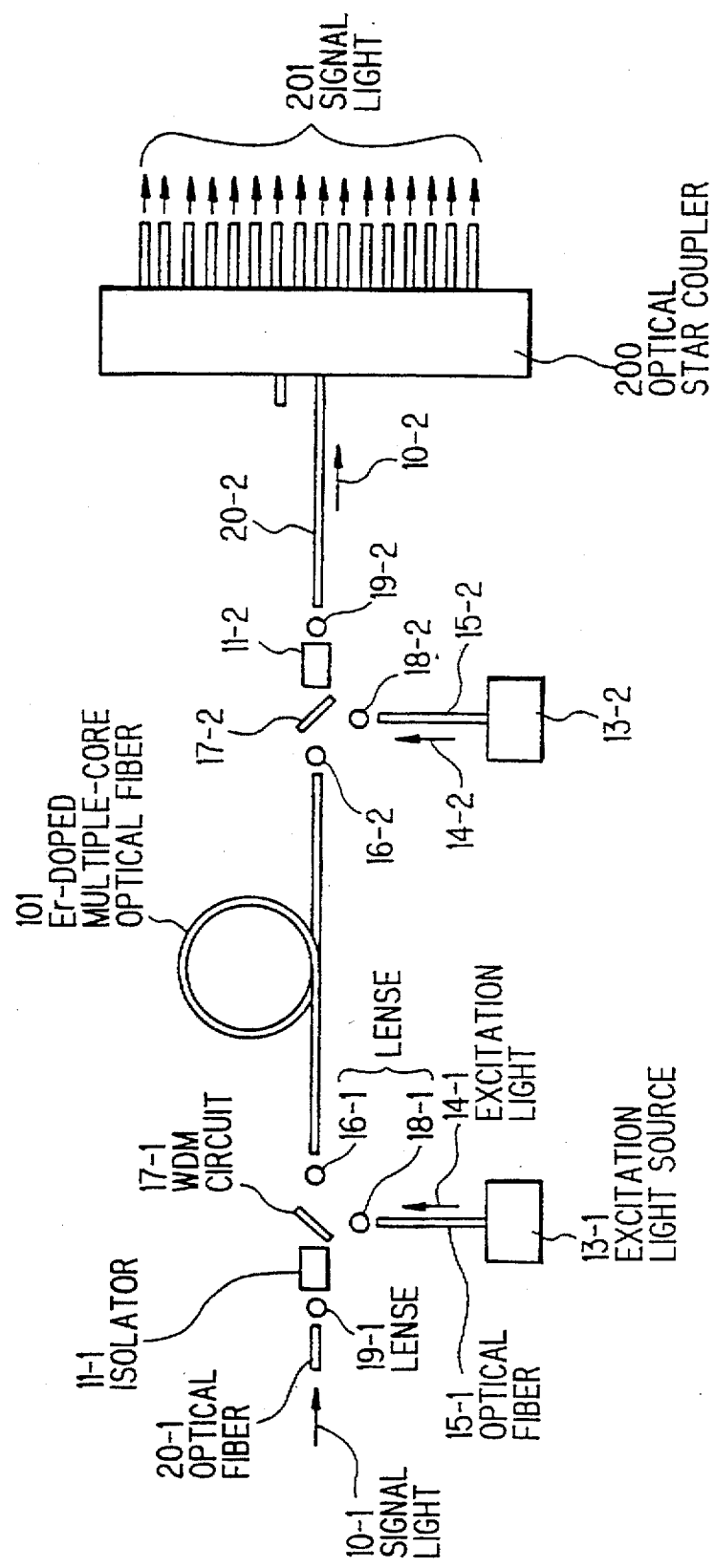
FIG. 25 is a structural view showing an optical fiber amplifying multiplexer/demultiplexer in a preferred embodiment according to the invention.

FIG. 25 show an optical fiber amplifying distributor in a preferred embodiment according to the invention, wherein like parts are indicated by like reference numerals as used in FIGS. 23 and 24. In the embodiment, in order to output and distribute a plurality of amplified signal lights simultaneously, it further comprises an optical star coupler 200 connected to the output end of the optical fiber 20-2 in the optical fiber amplifier shown in FIG. 23. An N input (N:1,2) and M output (M≧2) star coupler may be used, and one of the input ends is connected to the output optical fiber 20-2. FIG. 25 shows N=2 and M=16, however, N=1 and M=4, 8, 32, 64 . . . may be used. Both fiber type and waveguide type optical star coupler may be used. In the embodiment, the mode field diameters of the output optical fiber 20-2 and the input optical fiber of the star coupler 200 may be approximately equal to that of the Er-doped multiple-core optical fiber 101. In this case, connecting loss becomes low and reflected lights are eliminated.

Figure 26:
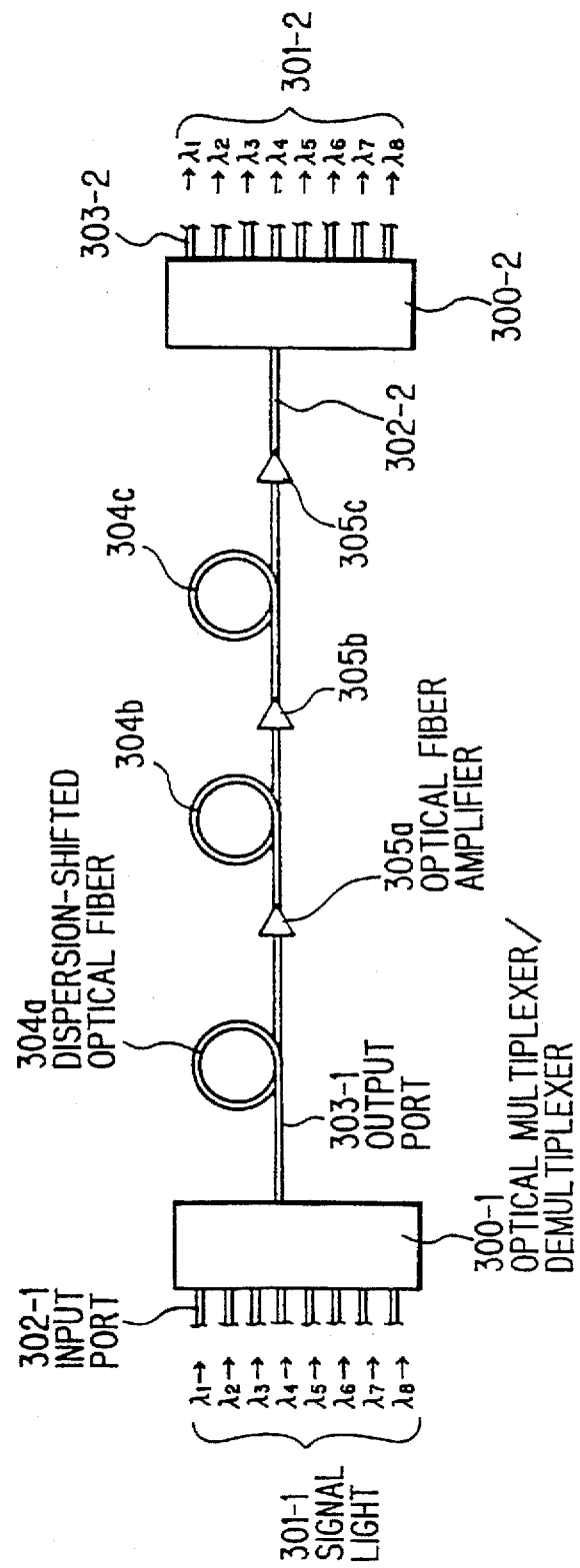
FIG. 26 is a structural view showing an optical fiber amplifying repeater in a first preferred embodiment according to the invention.

FIG. 26 shows an optical fiber amplifying repeater in a first preferred embodiment according to the invention. The optical fiber amplifying repeater comprises dispersion-shifted optical fibers 304a, 304b and 304c, optical fiber amplifiers 305a, 305b disposed between the adjacent dispersion-shifted optical fibers, an optical fiber amplifier 305c connected to an output end of the dispersion-shifted optical fiber 304c, and optical multiplexer/demultiplexer 300-1 and 300-2, an output port 303-1 and an input port 302-2 of which are connected to an input end of the dispersion-shifted optical fiber 304a and an output end of the optical fiber amplifier 305c, respectively. The optical multiplexer/demultiplexer 300-1 is provided with input ports 302-1, into which signal lights of λ1~λ8 are input, respectively. The optical multiplexer/demultiplexer 300-2 is provided with output ports 303-2, from which each amplified signal light λ1~λ8 are output. In operation, signal lights of λ1~λ8 are input into the optical multiplexer/demultiplexer 300-1 and multiplexed. the multiplexed signal lights propagate the dispersion-shifted optical fibers 304a, 304b and 304c, and are amplified by the optical fiber amplifiers 305a, 305b and 305c. Finally, the amplified multiplexed signal lights are demultiplexed by the the optical multiplexer/demultiplexer 300-2, then each separated amplified signal light of λ1~λ8 is output from the output ports 301-2. As each optical fiber amplifier 305a, 305b and 305c has the flat characteristics of gain to wavelength over broad wavelength bands, optical signal-to-noise ratio and optical cross-talk characteristics are kept in high performance. Moreover, mode field diameters of the dispersion-shifted optical fibers 304a, 304b and 304c may be approximately equal to those of the optical fiber in the optical fiber amplifiers 305a, 305b and 305c. In this case, connecting loss becomes low and reflected lights are eliminated. As a result, low noise figure, high speed, large-quantity and long-distance signal transmission becomes possible. In the embodiment, the number of channels is not limited to 8, but it may be 16, 32, 64 128 channels etc. Moreover, the number of dispersion-shifted optical fibers or optical fiber amplifiers is arbitrary.

Figure 27:
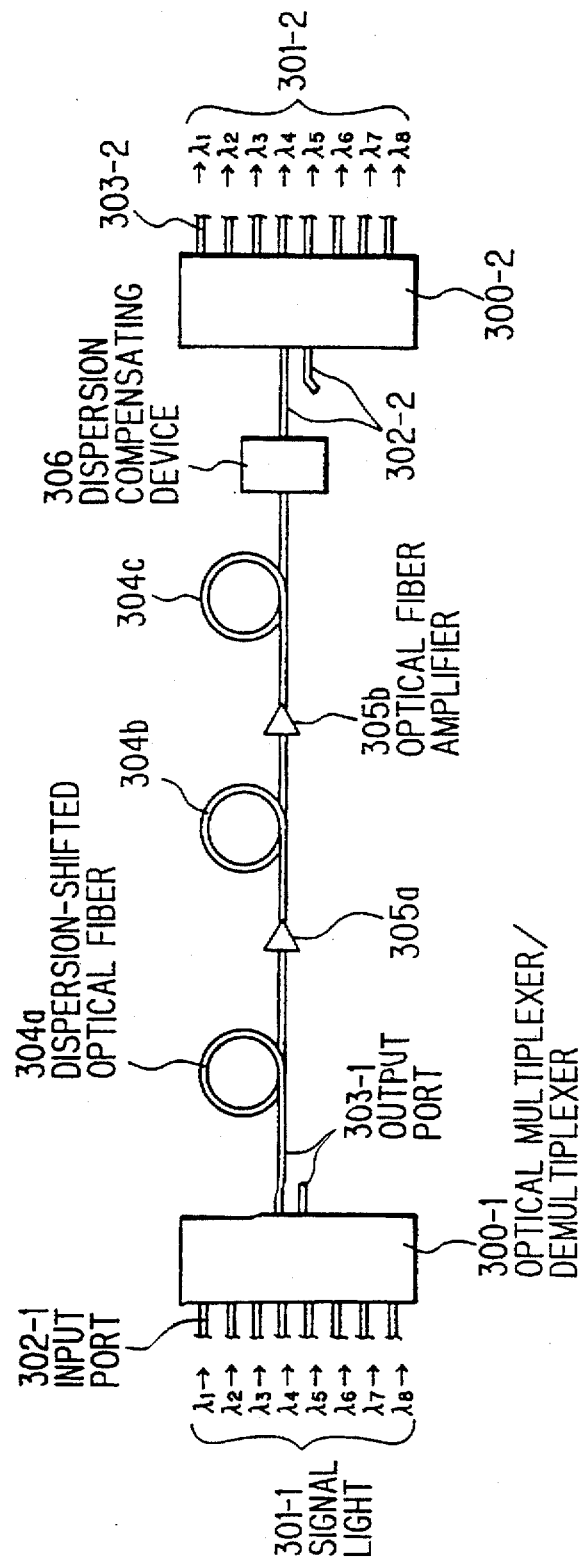
FIG. 27 is a structural view showing an optical fiber amplifying repeater in a second preferred embodiment according to the invention.

FIG. 27 shows an optical fiber amplifying repeater in a second preferred embodiment according to the invention, wherein like parts are indicated by like reference numerals as used in FIG. 26. In the embodiment, a dispersion compensating device 306 is substituted for the optical fiber amplifier 305c in FIG. 26. The dispersion compensating device 306 may by an optical fiber, or a waveguide device. For high speed, large-quantity and long distance signal transmission, the dispersion characteristics may be important issues. So, the dispersion compensating device 306 is provided.

In each embodiment, besides Er, at least one of other rare earth elements such as Pr, Nd, Yb, Sm, Ce, etc. may be doped into each core. Moreover at least two among them may be doped. The main material used as cores may include $SiO_2$ including at least one dopant for controlling a refractive index, such as Ge, P, Al, Ti, B etc., fluoride and multicomponent materials. The material used as a primary cladding layer and an outer cladding layer may includes $SiO_2$, $SiO_2$ including at least one dopant for controlling a refractive index, fluorine component and multi-component°

As well explained above, the invention provides advantages set out below.

(1) light power propagating through each core, or amplification degree of each core are equally balanced. Therefore, a rare earth element-doped optical fiber amplifier having widely flat characteristics of gain to wavelength at higher gain range is obtained.

(2) such rare earth element-doped optical fiber amplifiers are combined with dispersion-shifted optical fibers. Therefore, higher gain, large-quantity and long-distance signal transmission is possible in optical fiber amplifying repeating.

(3) moreover, such rare earth element-doped optical fiber amplifiers are combined with a optical star coupler or optical multiplexer/demultiplexers. Therefore, signal-to-noise ratio and optical cross-talk characteristics are kept in high performance in wavelength division multiplexing transmission.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A rare earth element-doped multiple-core optical fiber amplifier, comprising: a rare earth element-doped multiple-core optical fiber, comprising: a plurality of cores each having a refractive index of $n_w$ doped with at least one rare earth element therein; and an outer cladding layer having a refractive index of $n_c$ ($n_w > n_c$), and covering said cores; wherein said cores are positioned substantially on a central axis of said outer cladding layer, at least one of which is surrounded by remaining cores having a larger core diameter than said surrounded core, at least one pumping light source;

at least one wavelength division multiplexing circuit for coupling an pumping light with one end of said rare earth element-doped multiple-core optical fiber; and an isolator disposed between said wavelength division multiplexing circuit and said one end of said rare earth element-doped multiple-core optical fiber.

2. A rare earth element-doped multiple-core optical fiber amplifier, comprising: a rare earth element-doped multiple-core optical fiber, comprising: a plurality of cores each doped with at least one rare earth element therein; and an outer cladding layer having a lower refractive index than said cores, and covering said cores; wherein said cores are positioned substantially on a central axis of said outer cladding layer, at least one of which is surrounded by remaining cores having a higher refractive index than said surrounded core, at least one pumping light source;

at least one wavelength division multiplexing circuit for coupling an pumping light with one end of said rare earth element-doped multiple-core optical fiber; and an isolator disposed between said wavelength division multiplexing circuit and said one end of said rare earth element-doped multiple-core optical fiber.

3. A rare earth element-doped multiple-core optical fiber amplifier, comprising: a rare earth element-doped multiple-core optical fiber, comprising: a plurality of cores each doped with at least one rare earth element therein; and an outer cladding layer having a lower refractive index than said cores, and covering said cores; wherein said cores are positioned substantially on a central axis of said outer cladding layer, at least one of which is surrounded by remaining cores containing a larger amount of rare earth element than said surrounded core, at least one pumping light source;

at least one wavelength division multiplexing circuit for coupling an pumping light with one end of said rare earth element-doped multiple-core optical fiber; and an isolator disposed between said wavelength division multiplexing circuit and said one end of said rare earth element-doped multiple-core optical fiber.

4. A rare earth element-doped multiple-core optical fiber system, comprising:

a plurality of cores each having a first refractive index doped with at least one rare earth element;

a cladding layer having a second refractive index lower than said first refractive index for surrounding said plurality of cores, said plurality of cores being positioned in a central region of said cladding layer;

at least one rare earth element-doped multiple-core optical fiber amplifier for amplifying a signal light by stimulated emission; and at least one dispersion-shifted optical fiber connected to an input end and/or an output end of said rare earth element-doped multiple-core optical fiber amplifier, wherein said plurality of cores comprises a first group of one or more cores, and a second group of cores, such that said second group of cores surrounds a periphery of said first group of one or more cores to equalize powers propagated through each core of said first and second groups.

5. A rare earth element-doped multiple-core optical fiber system according to claim 4, wherein:

an optical multiplexer/demultiplexer is connected to an input end and/or an output end of said rare earth element-doped multiple-core optical fiber system.

6. A rare earth element-doped multiple-core optical fiber system according to claim 4, wherein:

an optical star coupler for distributing amplified signal lights of different wavelength is connected to an input end and/or an output end of said rare earth element-doped multiple-core optical fiber system.

* * * * *